United States Patent
Barnard et al.

(10) Patent No.: US 6,684,191 B1
(45) Date of Patent: *Jan. 27, 2004

(54) SYSTEM AND METHOD FOR ASSESSING A PROCUREMENT AND ACCOUNTS PAYABLE SYSTEM

(75) Inventors: Ray F. Barnard, Endicott, NY (US); Philip J. Cirulli, Endicott, NY (US); Kerin J. Flannery, Endicott, NY (US); Carl J. Lanuti, Endwell, NY (US); Jane M. Murphy, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,257

(22) Filed: Nov. 22, 1999

(51) Int. Cl.[7] .............................................. G06F 17/60
(52) U.S. Cl. ......................................................... 705/7
(58) Field of Search ........................ 705/7–11; 707/10, 707/104.1, 500; 709/203

(56) References Cited

U.S. PATENT DOCUMENTS

| | | | |
|---|---|---|---|
| 4,862,376 A | 8/1989 | Ferriter et al. | 700/107 |
| 4,875,162 A | 10/1989 | Ferriter et al. | 705/29 |
| 5,189,606 A | 2/1993 | Burns et al. | 705/10 |
| 5,224,034 A | 6/1993 | Katz et al. | 705/7 |
| 5,233,513 A | 8/1993 | Doyle | 705/7 |
| 5,283,745 A | 2/1994 | Tanaka | 700/99 |
| 5,287,267 A | 2/1994 | Jayaraman et al. | 705/10 |
| 5,315,509 A | 5/1994 | Natarajan | 705/28 |
| 5,365,425 A | * 11/1994 | Torma et al. | 705/2 |
| 5,381,332 A | 1/1995 | Wood | 705/8 |
| 5,450,317 A | 9/1995 | Lu et al. | 705/10 |
| 5,737,727 A | 4/1998 | Lehmann et al. | 705/7 |
| 5,793,632 A | 8/1998 | Fad et al. | 705/400 |
| 5,848,394 A | 12/1998 | D'Arrigo et al. | 705/8 |
| 6,381,610 B1 | * 4/2002 | Gundewar et al. | 707/104 |

FOREIGN PATENT DOCUMENTS

EP 0 895 171 A2 * 2/1999 ............ G06F/17/60

OTHER PUBLICATIONS

"SAP Offers End–User Training Products and Consulting Services, Furthering Its TeamSAP Commitment to Customers." Business Wire, Sep. 14, 1998.*
Stevens, Tim. "Proof Positive." Industry Week, vol. 247, No. 15, pp. 22–28, Aug. 17, 1998.*
"SAP Announces SAP FOCUS Initiative to Deliver First Solution For Complete Customer Relationship Life Cycle." Business Wire, Sep. 14, 1998.*
Noori, Hamid and Russell Radford, *Production and Operations Management Total Quality and Responsiveness*, Chapter 12 "Project Management". New York; McGraw–Hill, Inc. 1995. 377–416.
Anonymous, RD 417032, "On–line IP portfolio management and advice . . . ", Derwent Info Ltd., Dialog File 351:Derwent WPI data base printout, Abstract, Jan. 10, 1999.

* cited by examiner

*Primary Examiner*—Tariq R. Hafiz
*Assistant Examiner*—Susanna Meinecke-Diaz
(74) *Attorney, Agent, or Firm*—Shelly M Beckstrand

(57) ABSTRACT

A system for deploying to a client accounting installation a general procurement and accounts payable application specifically configured for the client by an enterprise includes a database server for (1) maintaining on a storage device a database of templates describing procedures for assessing, preparing, developing, deploying and supporting the application, and for (2) serving these templates to team members operating web-enabled terminals for coordinating, recording and tracking team activities with respect to the application while generating a description for adapting a front end server and an accounting system server to the requirements of the client.

10 Claims, 18 Drawing Sheets

SYSTEM AND METHOD FOR ASSESSING A PROCUREMENT AND ACCOUNTS PAYABLE SYSTEM

CROSS REFERENCES TO RELATED APPLICATIONS

U.S. patent applications Ser. No. 09/444,254, entitled "System and Method for Project Preparing a Procurement and Accounts Payable Process", Ser. No. 09/444,255, entitled "System and Method for Project Designing and Developing a Procurement and Accounts Payable Process", Ser. No. 09/444,253, entitled "System and Method for Deploying a Procurement and Accounts Payable Process", and Ser. No. 09/444,256, entitled "System and Method for Ongoing Supporting a Procurement and Accounts Payable Process" filed concurrently herewith, are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to the implementation of a procurement and accounts payable system or application. More particularly, it relates to a system and method for assessing, preparing, designing and developing, deploying, and supporting a general procurement and accounts payable system using electronic requisitions.

2. Background Art

A services company may be very good at implementing information technology (IT) solutions. However, as customer engagements increase, the ability of company to execute numerous engagements on time and within budget with quality becomes more difficult.

Today there exist many different software packages that perform project management and classes that teach methodologies for implementing solutions that involve information technology and services. However, there is no process that combines these activities along with an evaluation of a client's general procurement (GP) and accounts payable (AP) system, or application, into one package while providing detailed implementation instructions along with templates for completing the major deliverables required over the course of the project. Templates, may be used herein as an equivalent term for page, form, or document as used in connection with Lotus Notes. In Lotus Notes, a page is a database design element that displays information; a form, like a page, displays information and also can be used to collect information; and documents are the elements that store information in the database. A user is presented a form including fields for entering information. When the user fills out the information and saves it, the information is saved in the data base as a document. When a user opens the document, the document uses the form as a template to provide the structure for displaying the data or information. Fields store data of various types, including text, dialog list, rich text, and so forth.

Scalability of engagements is a known problem, the most common solution to which is to increase the number of persons involved. Experience has shown that this increase results in customer dissatisfaction due to inadequate gathering of requirements, poorly trained implementation teams, missed schedules, increased costs, and lower quality.

It is characteristic of general procurement and accounts payable systems that no two are identical, and may differ even within wholly owned subsidiaries of a single corporation.

Consequently, there is a need in the art for a system and method for evaluating a potential client system and for adapting a general procurement and accounts payable system to the requirements of each of many potential clients. Further, there is a need for a system and method for. evaluating a potential client system and for adapting a general procurement and accounts payable system to the requirements of each of many potential clients which can be licensed to third party providers together with a system and method for monitoring and assuring the quality of services provided by those service providers.

There is a need in the art for an integrated system for assessing, preparing, designing and developing, deploying, and supporting a procurement and accounts payable system using electronic requisitions.

During project assessment, typically potential customers are contacted and evaluated by a marketing team that then recommends a product solution from their menu. There is no integration of Technical Team Leaders and Transition Management as key components of the installation. There is also limited to no flexibility to customize the product for the customer.

There is a large body of work on project planning in industry. While they are all more or less adequate, they do not provide the comprehensive integration of the client and supplier teams, Transition Management, and Quality required to accomplish a particular customer's goals.

Like project planning, project design and development processes are well known in industry. They usually consist of a project manager or team leader that manages the implementation of a project plan and interfaces with the client.

Deployment or implementation of a project is, again, a very standard operation. As the project plan steps are completed, they are usually held in queue until all necessary activities reach a point where the solution can be "turned on".

All projects have close out functions that wrap up the end of the project. However, they do not provide for continuing support across the multitude of functions that have been used to provide the customer with a solution.

It is an objective of the invention to provide a system and method for evaluating a client's general procurement and accounts payable (GP/AP) system.

It is an object of the invention to provide an optimized solution for out-sourcing procurement of goods and services.

It is an object of the invention to provide a system and method for training service providers.

It is an object of the invention to provide a system and method for managing service providers to assure quality of service.

It is an object of the invention to provide a system and method for managing a project.

It is an object of the invention to provide an optimized general procurement and accounts payable system characterized by lower costs, a paperless process, and more comprehensive service with a shorter cycle time.

SUMMARY OF THE INVENTION

A system for assessing a general procurement and accounts payable application of a customer of an enterprise includes a server; a storage device connected to the server; a plurality of team terminals; and a communication link interconnecting the server and terminals. The server is operable for (1) maintaining a database of templates on the storage device describing procedures for assessing the application, and (2) serving the templates to a members of cross functional team operating the terminals for coordinating, recording and tracking team activities with respect to the application.

A method for assessing a general procurement and accounts payable application includes maintaining a database of templates describing procedures for assessing the general procurement and accounts payable application and operating a plurality of web-enabled user terminals to access via a server the database of templates for coordinating tasks by a plurality of enterprise teams implementing the procedures.

In accordance with an aspect of the invention, there is provided a computer program product configured to be operable to perform the method of the invention for assessing a general procurement and accounts payable application.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 5 and 6 also illustrate fields collected in the database and selectively displayed at user terminals of FIG. 1 for each summary and detail task, respectively, of a GP/AP system for a particular customer or project.

BEST MODE FOR CARRYINGS OUT THE INVENTION

Figure 1:
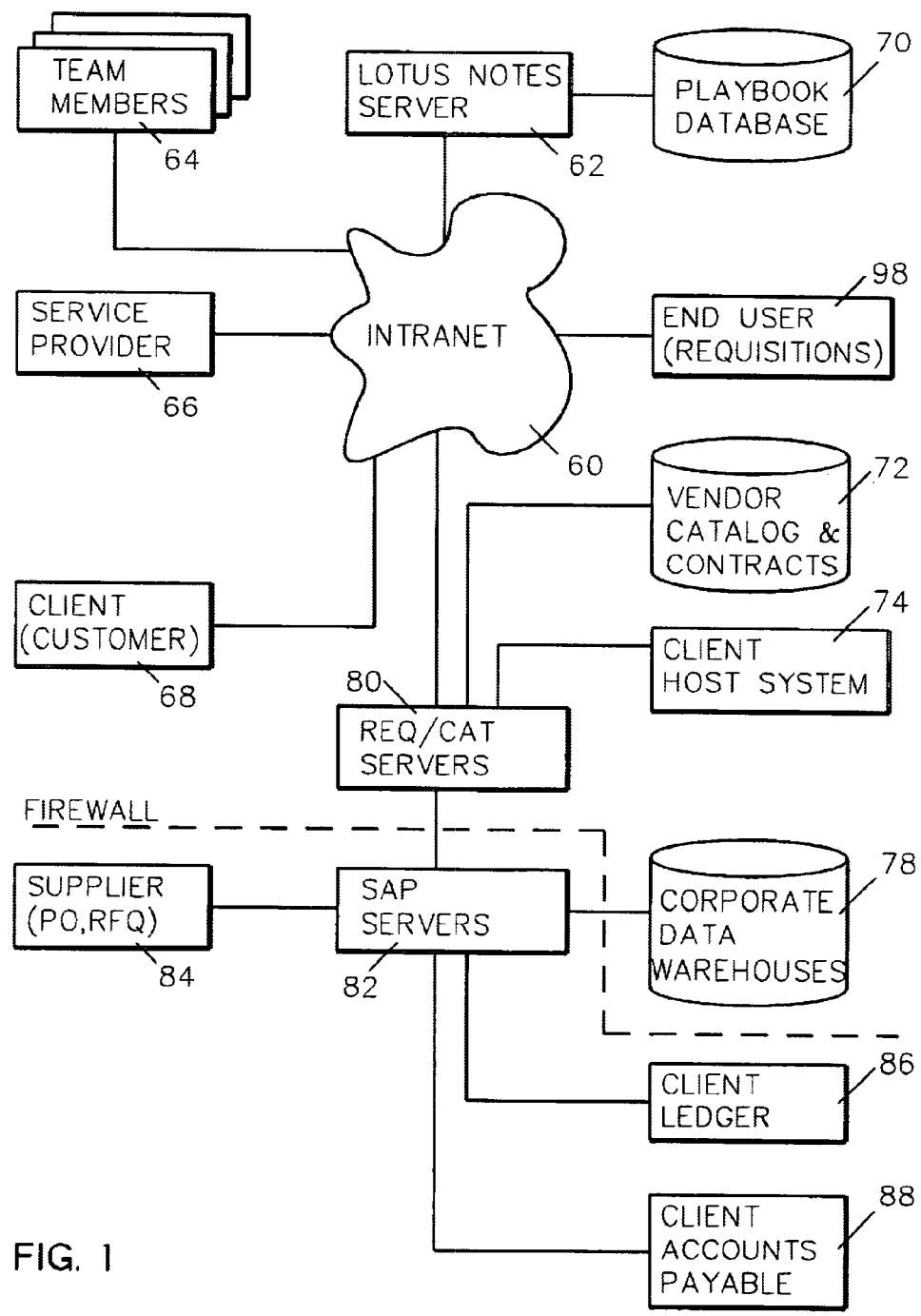
FIG. 1 is a high level block diagram of a general procurement and accounts payable development and implementation system in accordance with a preferred embodiment of the invention.

Referring to FIG. 1, in accordance with the preferred embodiment of the invention, intranet communication facilities interconnect a plurality of team member terminals 64, zero or more service provider terminals 66, and client (also referred to as customer) terminals 68, and a server 62, preferably a Lotus Notes server.

Server 62 references and maintains playbook database 70. Database (also referred to as the playbook, or playbook database) 70 is provided for implementing procurement and accounts payable systems. This playbook 70 defines implementation steps and templates for creating the many required deliverables and project management functions. These functions include start and end dates, effort, duration, and so forth. This playbook also provides the steps and templates for training service providers 66 and serves as the repository for completed templates and as a source for auditing the performance of the service providers. As used herein, unless otherwise apparent from the context, system and applications are used to refer to hardware, software, procedures, instructional materials, and so forth, for implementing a general procurement and accounts payable process.

Also attached to intranet 60 are requisition and catalog (Req/Cat) servers 80. Server 80 functions as a front end server to accounting system server 82, and is connected to a file of vendor catalogs and contracts 72, to a client (customer) host system 74, and through a firewall to SAP servers 82. SAP server 82 is an accounting driver for the procurement and accounts payable (A/P) system of the customer. SAP servers 82 are connected to supplier systems 84, to a customer data warehouse 78, and to customer ledger and accounts payable systems 86, 88.

During the operational phase of a completed and functioning system, a customer (aka end user, or client) 98 enters requisitions via the intranet to server 80. Server 80 accesses client host system 74 for pricing, reports, etc., and vendor catalogs and contracts 72 to gather information needed by SAP servers 82 to generate purchase orders or requests for quotes (RFQs) to supplier 84, to update data warehouse 78, client ledger 86, and client accounts payable 88 systems. Warehouse 78 stores client data maintained by the supplier of the Req/Cat and general procurement system, which supplier may be the primary enterprise (a primary services organization, such as the IBM Corporation) with control of the design and implementation of the system, or a contractor of the enterprise qualified as a third party service provider.

In operation, during presales, assessment, preparation, development, deployment and support stages, team members 64, access database 70 via intranet 60 and server 62 to create a playbook including a detailed description of an accounts payable and Req/Cat system for a particular customer (aka client). This description is then used to personalize Req/Cat servers 80 and SAP servers 82 for the customer installation. During operation, a user 98 accesses Req/Cat server 80 via intranet 60 to enter a requisition or to query the status of previously entered requisition. When entering a requisition, Req/Cat responds to end user 98 with a form to complete. Req/Cat 80 accesses SAP server 82 through the firewall with the requisition or request for status. SAP server 82, responsive to a requisition, issues a purchase order or request for quote to supplier 84, and updates accounts payable 88 and ledger 86, as required through the normal procurement and accounting process implemented on behalf of the customer.

Figure 2:
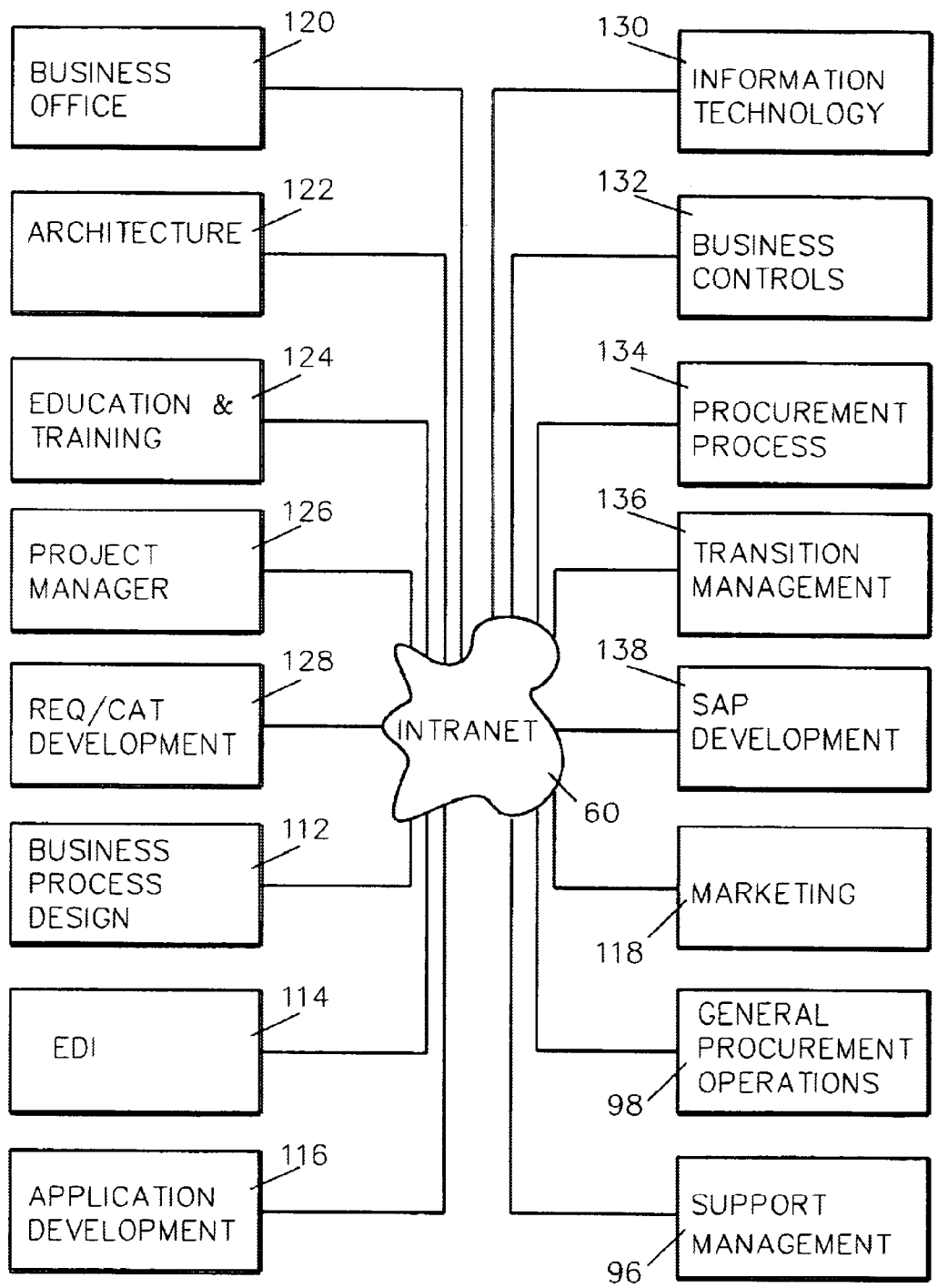
FIG. 2 is a block diagram illustrating team relationships within the general procurement and accounts payable (GP/AP) development and implementation system of a preferred embodiment of the invention.

Referring to FIG. 2, various departments and individuals representing team members 64 include business office 120, architecture 122, education and training 124, project manager 126, Req/Cat development 128, business process design 112, electronic data interchange (EDI) 114, application development 116, information technology 130, business controls 132, procurement process 134, transition management 136, SAP development 138, marketing 118, general procurement operations 98, and support management 96. Each of these departments and individuals perform various rolls and functions during the life of the project from assessment through deployment and use, as will be more fully described hereafter in connection with FIG. 3.

Figure 3:
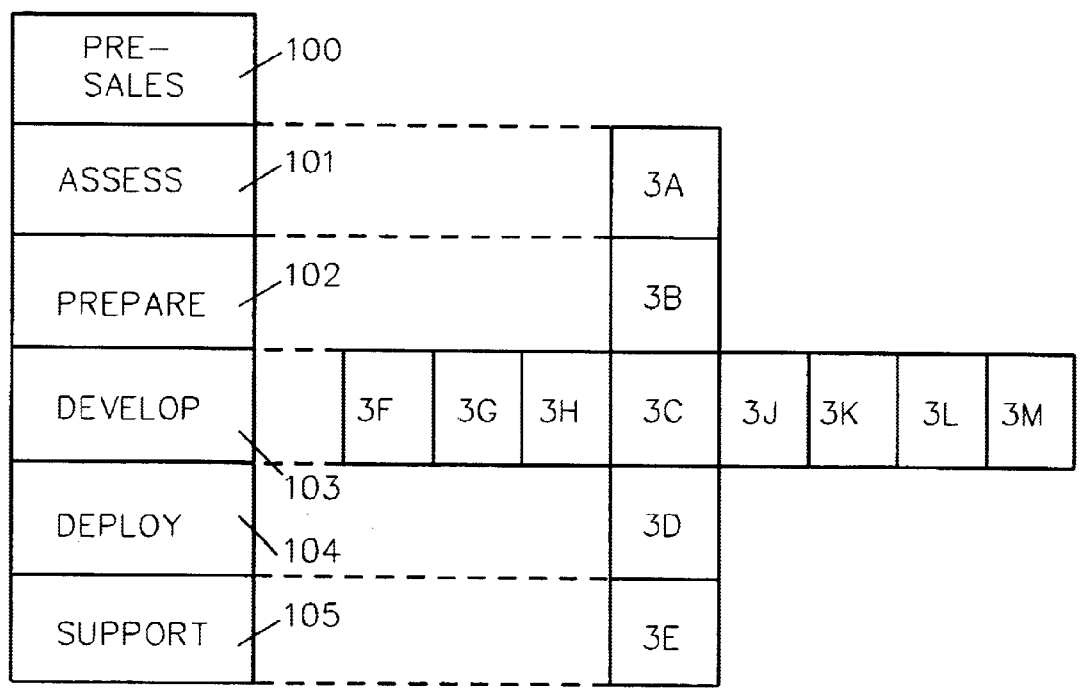
FIGS. 3A through 3M, arranged as shown in FIG. 3, are a flow diagram of the assessment, preparation, development, deployment and support phases of the method of a preferred embodiment of the invention.

Referring to FIG. 3, in accordance with the preferred embodiment of the method of the invention, assessment 101, preparation 102, development 103, deployment 104 and support 105 stages are executed to design, implement, and use a general procurement and accounts payable (GP/AP) system for a customer. Through these stages 101–105, procedures and methods are provided for seamlessly integrating all aspects of a total GP/AP system, including creating an electronic purchase requisition for goods and services with flexible approval functions, through invoicing and payment.

Further in accordance with the preferred embodiment of the invention, there is provided a web enabled delivery system.

Further in accordance with the preferred embodiment of the invention, there is provided a system and method for auditing service provider activities without being on site.

High level summary tasks implemented by playbook 70 database include business controls, information technology, SAP, communication, process, testing, configuration, project management, transition management, education and training, requisition and catalog (Req/Cat). Each of these summary tasks, as well as the drill-down (aka subsidiary) tasks implementing the details of each, may be accessed by team members 64 and service provider 66s within the playbook database 70.

Figure 4:
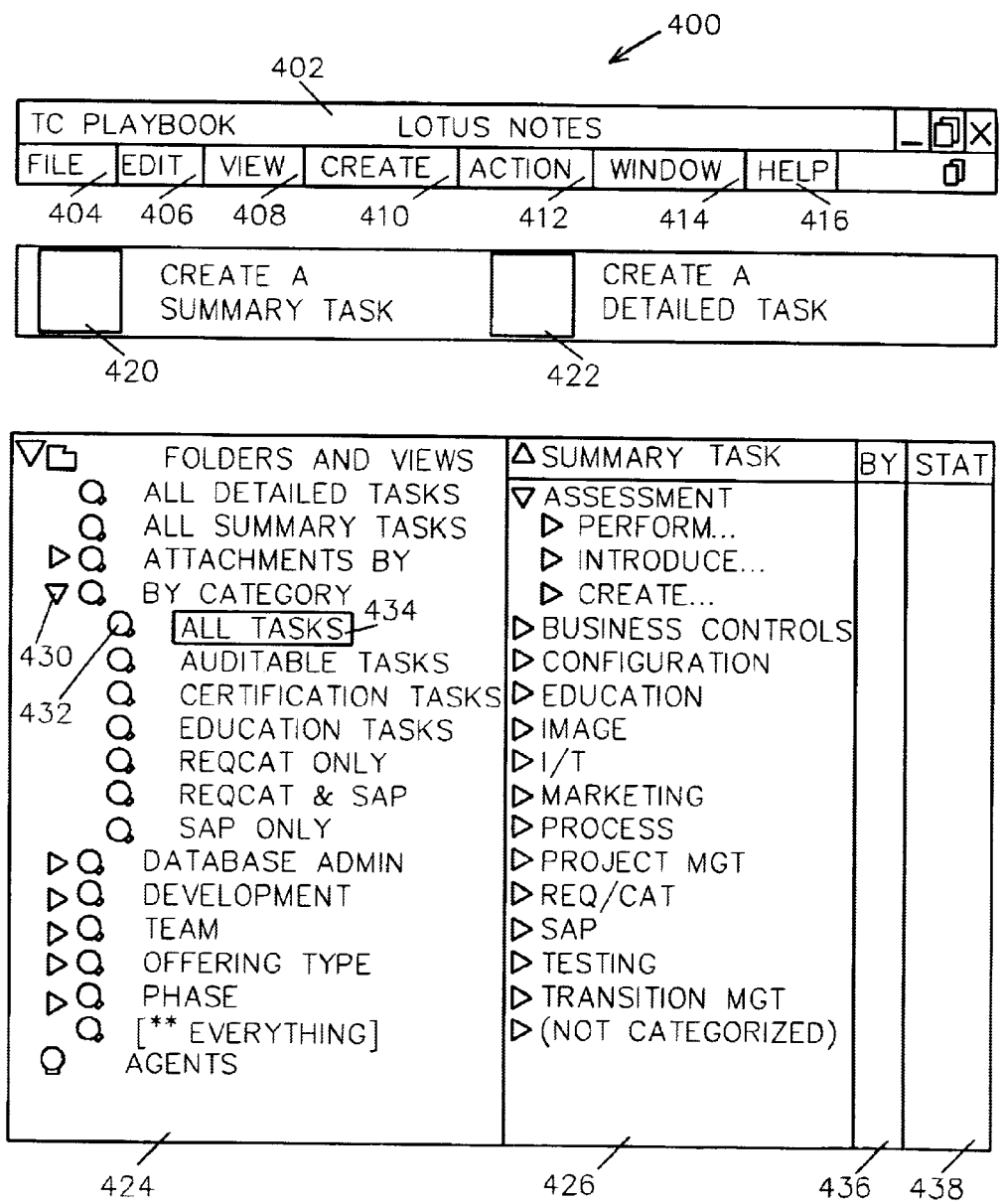
FIG. 4 represents a terminal display of a playbook summary view.

Referring to FIG. 4, the playbook summary view 400 is illustrated. View 400 includes a title bar 402; pull down menu tabs file 404, edit 406, view 408, create 410, actions 412, window 414, help 416; create a summary task selection button 420, create a detailed task button 422, a folders and views section 424, and a task title display and selection area 426 which also includes a by column 436 and a status column 438 with an entry for each task displayed in area 426. With by category button 430 and all tasks button 432 selected, all tasks 434 is highlighted and display 426 presents a listing of tasks organized by category.

Figure 5:
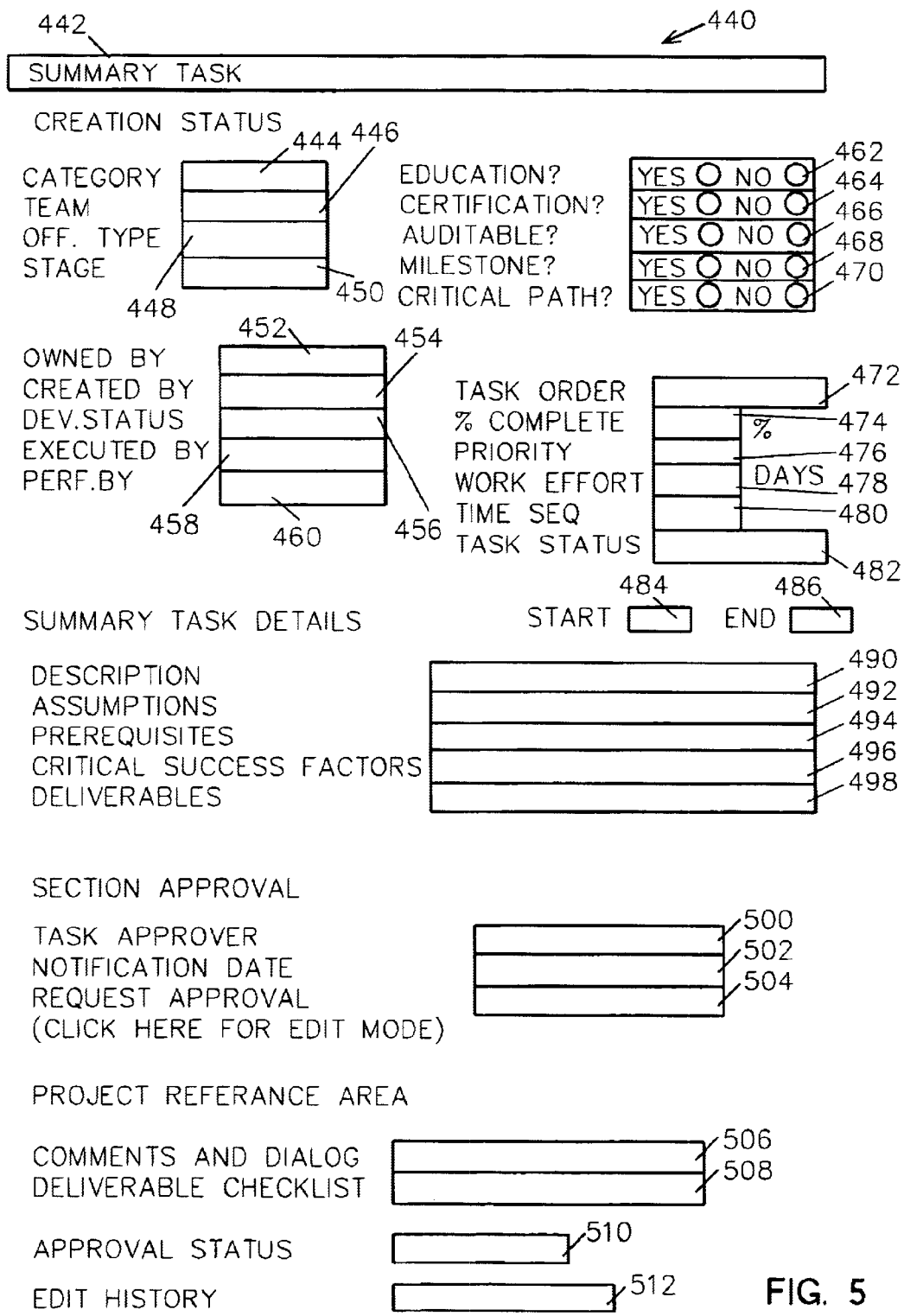
FIG. 5 illustrates a terminal display of the template presented by the server at a user terminal of FIG. 1 in response to selection by a user of "create a summary task" from the playbook summary view.
Figure 6:
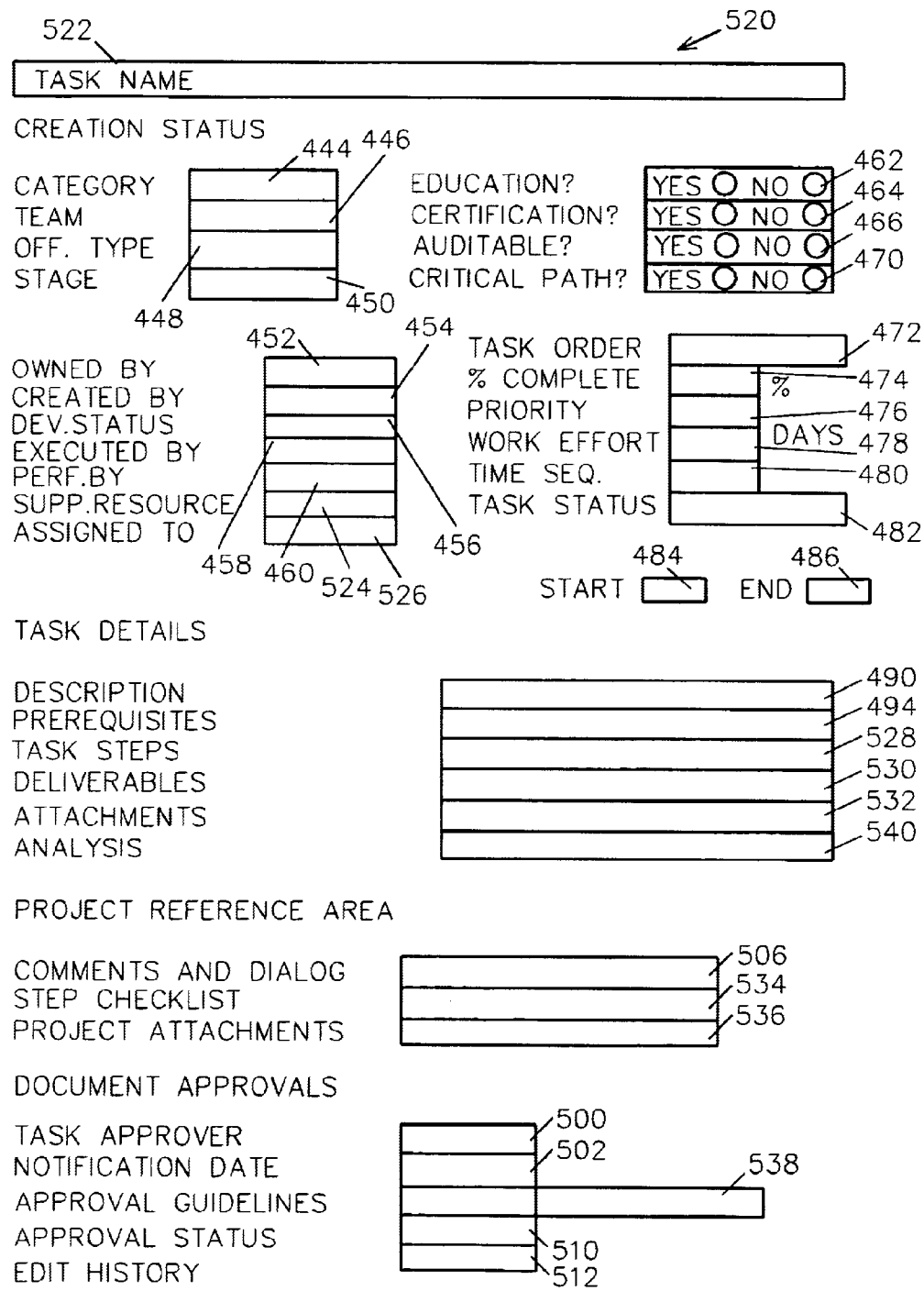
FIG. 6 illustrates a terminal display of the template presented by the server at a user terminal of FIG. 1 in response to selection by a user of "create a detailed task" from the playbook summary view.

Referring to FIG. 5, the summary task template 440 presented to the user upon selection of create a summary task 420 is illustrated. As will be described hereafter, there are two flavors of template 440, one for major operations, and one for major steps within each major operation. Referring to FIG. 6, the detail task template 520 presented to the user upon selection of create a detailed task 422 is illustrated.

Selection of create summary task 420 presents a first summary task template 440 that used to design and describe a high level summary task for one of the playbook operations. In a preferred embodiment of the invention, there are thirteen such high level summary tasks, including assessment, business controls, configuration, education, image, information technology (I/T), marketing, process, project management, requisition and catalog (req/cat), SAP, testing, and transition management. The summary and detail tasks within these high level summary tasks are further organized into five major processing segments: assessment 101, project preparation 102, project design and development 103, deployment 104, and ongoing support 105. A high level summary task provides a summary of the inputs to the task, and of the output (deliverables) after all detailed tasks are completed. There two levels, or templates for summary tasks: one for major operations, the second for major steps within each operation.

Activation of create a detail task 422 presents to the user a third template 520 which is used to summarize the detailed tasks for each major step of a summary task.

The first and second templates 440 are almost identical. They include the fields set forth in Tables 1 and 2. Third template 520 contents are summarized in Table 3.

TABLE 1

SUMMARY TASK TEMPLATES PART 1

| SECTION 1: | CREATION STATUS |
|---|---|
| Category 444: | Categories include education, req/cat development, SAP development, transformation management, architecture, procurement process. |
| Team 446: | Specific project team responsible for this task. |
| Offering type 448: | Kind of product being brought to client: req/cat only, SAP only, and req/cat and SAP. |
| Stage 450: | The stages are assessment 101, project preparation 102, project development 103, deployment 104, and support 105. |
| Doc owned by 452: | Team 140 owner of document, the designer of this one template. The teams 140 are those illustrated in FIG. 2. |
| Doc created by 454: | Author of this one template. |
| Dev status 456: | Approval status: first draft, final edit, final approval, etc. Only owner 452 can change this status. Only the owner 452 can approve the content of this template (task). |
| SECTION 2: | IMPORTANCE BUTTONS |
| Education 462: | Represents a combination of things, including (1) does someone need to be taught how to do this task, (2) is it something that should be included in the education package to the customer. |
| Certification 464: | Indicates whether or not an implementer of this task (ie, service provider) must be certified. |
| Auditable 466: | Indicates whether or not it is a task that Enterprise would be able to or needs to audit performance by the implementer/service provider |
| Milestone 468: | Indicates if this task is a critical accomplishment in the path of completing the implementation of the offering type. |
| Critical path 470: | Indicates if this is a task that must be completed in order to advance to the next task in order to complete the offering type, and can change during the course of the project as tasks are completed and the overall environment changes. |
| SECTION 3: | IMPLEMENTATION |
| Task order 472: | A number assigned to a detailed task that shows its order under the summary task. |
| % complete 474: | An estimate of how complete is this task document in its development for a particular customer. |
| Executed by 458: | Name of service provider (eg., Enterprise, or some Enterprise partner). |
| Performed by 460: | Technical team responsible for doing this task. |
| Priority 476: | High, medium, low priority, based on whether this task is in critical path, and whether or not it needs to be done in support of some subsequent task. |
| Work effort 478: | Estimated time required to complete this task. |

TABLE 1-continued

SUMMARY TASK TEMPLATES PART 1

| | |
|---|---|
| Sequence 480: | A number assigned to a summary task that shows its order under a higher level task. |
| Task status 482: | Represents how far the service provider has progressed in its implementation of this task. This is rolled up to Lotus Notes database 70 to enable the owner to track progress of the service providers during the audit phase. |

Table 2 sets forth the template 440 fields which may vary between templates, including those for major operations and major steps within an operation.

TABLE 2

SUMMARY TASK TEMPLATES PART 2

| SECTION 4: | SUMMARY TASK DETAILS |
|---|---|
| Description 490: | High level summary description of major operations or steps. |
| Assumptions 492: | What if any assumptions apply. |
| Prerequisites 494: | Tasks that must be completed before this task can complete. |
| Critical success factors 496: | Description of tools, techniques, relationships, understandings, technical and relationship skills and commitments, knowledge base of team and customer, and so forth, needed to accomplish this task. |
| Deliverables 498: | Expected output of this task. |
| SECTION 5: | APPROVALS |
| Task approver 500: | Identity of approvers. |
| Notification date 502: | Date approvers notified. |
| Request approval 504: | Electronic signature of approval. |
| SECTION 6: | PROJECT REFERENCE |
| Comments and dialog 506: | General comments (open season). |
| Deliverable checklist 408: | Checklist of deliverables. |
| Approval status 510: | List of approvers of this document and status of their approval. |
| Edit history 512: | Listing of persons who have modified this document during its preparation (service provider is not allowed to change these task descriptions.) |

TABLE 3

DETAIL TASK TEMPLATE

| | |
|---|---|
| SECTION 1: | CREATION STATUS |
| SECTION 2: | IMPORTANCE BUTTONS |
| SECTION 3: | IMPLEMENTATION |
| Sections 1, 2 and 3 are the same as for templates 440, with the addition of: | |
| Support resources 524: | People needed to support completion of this task. |
| Assigned to 526: | Person executing this task. |

TABLE 3-continued

DETAIL TASK TEMPLATE

| SECTION 4: | DETAIL TASK DETAILS |
|---|---|
| Description 490: | Description of this task. |
| Prerequisites 494: | Tasks that must be completed before this task can complete. |
| Task steps 528: | Specific detailed steps that need to be accomplished to complete the task. |
| Analysis 540: | A description of what needs to be analyzed to come up with the right answer for the customer. (The resulting output will vary depending upon the results of the analysis - but this document doesn't change as a result of the analysis) |
| Deliverables 530: | Expected output of the task. |
| Methodology attachments 532: | Potential attachments, may be blank: anything from presentation charts, to questionnaires, to architecture charts - depends upon the task. |
| SECTION 5: | PROJECT REFERENCE AREA |
| Comments & Dialog 506: | Comments. |
| Deliverable Checklist 508: | Checklist, attachment listing (other than method attachments, supra). |
| Approval status 510 | List of approvers and the status of their approval (with respect to approval of this document, not of the implementation of the task, which is handled by the audit process). |
| Edit history 512: | Listing of persons who have modified this document during its preparation (service provider is not allowed to change these task descriptions.) |

Database 70 at server 62 includes all summary and detail tasks templates which have been completed in a set for a particular customer. An initial set of the tasks listed in Table 4 is provided for each customer, but during project implementation phases 101–105, these are configured or personalized to the customer.

While many summary and detailed tasks of Table 4 do not appear in the flow chart of FIGS. 3A–3M, those selected illustrate a flow from start to finish across the five major stages—and form a representative, if not critical, path through them. As shown in FIGS. 3, and 3A–3M, the transitions between stages 100–105 are, in some instances, blurred and a particular task may be allocated to either or both of two of these stages.

In each stage, the key to success is the integration through the use of the templates of the groups (FIG. 2) and activities (Table 4, both summary tasks and detail tasks.) Also, an important aspect of the invention is the method provided across the five stages (FIG. 3) for effecting a transition from a legacy process, including hardware, software, work procedures and human resources, to a new process.

Table 4 is a chart of summary and detail tasks, pursuant to a particular embodiment of the invention, available for presentation in display area 426 of playbook summary view 400 upon selection of button 432. Selection by a user in display area 426 of a task designated with two or three alpha-numeric reference numerals P1, P11, P12, . . . , results in display of a template 440 personalized to the summary task, and selection of a task designated with four or more alpha-numeric reference numerals P111, P112, . . . , result in display of a template 520 personalized to the detail task. A user with appropriate authority may then view, correct, update, approve or otherwise modify the displayed task. The names of the detail tasks set forth broadly the functions or method steps performed in implementing the superior summary task. In Table 4, each summary task is identified in the first column by the stage 100–105 to which it pertains, in the second column by a task identifier P11, P12, . . . , and, for selected tasks, in the third column by the process step (150, . . . , 354 in FIGS. 3A–3M) to which it pertains. In general (with very few exceptions), a detail task pertains to the same stage 100–105 as its summary task.

TABLE 4

CHART OF SUMMARY AND DETAIL TASKS

|  | Stage | Task ID | Step | Summary Tasks / Detail Tasks |
|---|---|---|---|---|
| 1 |  | FOLDERS AND VIEWS |  |  |
| 2 |  | BY CATEGORY |  |  |
| 3 |  | ALL TASKS |  |  |
| 4 |  | p1 |  | ASSESSMENT |
| 5 | 101 | P11 |  | Perform customer service offering |
| 6 |  |  |  | assessment |
| 7 | 101 | P111 | 174 | Perform customer business |
| 8 |  |  |  | assessment |
| 9 | 101 | P112 |  | Perform customer business |
| 10 |  |  |  | assessment e-Req/Cat |
| 11 | 101 | P113 |  | Develop workshop management plan |
| 12 | 101 | P114 |  | Develop workshop management plan e- |
| 13 |  |  |  | Req/Cat |
| 14 | 101 | P115 |  | Review findings from marketing |
| 15 |  |  |  | procurement consulting engagement |
| 16 | 101 | P116 |  | Review findings from marketing |
| 17 |  |  |  | procurement consulting engagement |
| 18 |  |  |  | e-Req/Cat |
| 19 | 101 | P117 | 176 | Formulate workshop approach |
| 20 | 101 | P118 |  | Formulate workshop approach e- |
| 21 |  |  |  | Req/Cat |
| 22 | 101 | P119 |  | Prepare for workshop |
| 23 | 101 | P11A |  | Prepare for workshop e-req/Cat |
| 24 | 101 | P12 | 178 | Introduce recommend service offering to |
| 25 |  |  |  | customer |
| 26 | 101 | P121 |  | Present service offering to |
| 27 |  |  |  | customer (perform workshop) |
| 28 | 101 | P122 |  | Present service offering to |
| 29 |  |  |  | customer (perform workshop) e- |
| 30 |  |  |  | Req/Cat |
| 31 | 101 | P123 |  | Formulate proposal approach |
| 32 | 101 | P124 |  | Formulate proposal approach e- |
| 33 |  |  |  | Req/Cat |
| 34 | 101 | P13 |  | Create proposal and contract |
| 35 | 101 | P131 |  | Develop and cost proposal |
| 36 | 101 | P132 |  | Develop and cost proposal e-Req/cat |
| 37 | 101 | P133 |  | Draft and price customer contract |
| 38 | 101 | P134 |  | Draft and price customer contract |
| 39 |  |  |  | e-Req/Cat |
| 40 |  | P2 |  | BUSINESS CONTROLS |
| 41 | 103 | P21 |  | Business control requirements |
| 42 | 103 | P211 | 290 | Confirm business controls |
| 43 |  |  |  | requireinents |
| 44 | 103 | P212 |  | Confirm separation of duties (SOD) |
| 45 |  |  |  | requirements |
| 46 | 104 | P213 | 292 | Conduct ASCA self-assessment |
| 47 | 104 | P214 |  | Risk assessment |
| 48 | 104 | P215 | 224,294 | Conduct ASCA/business controls |
| 49 |  |  |  | review |
| 50 | 102 | P2151 |  | Confirm image production system |
| 51 |  |  |  | management strategy |
| 52 |  | P3 |  | CONFIGURATION |
| 53 | 103 | P31 | 320 | Conduct Req/Cat functional detailed fit |
| 54 |  |  |  | gap analysis |
| 55 | 103 | P311 |  | Confirm Req/Cat organizational |
| 56 |  |  |  | hierarchy |
| 57 | 103 | P312 |  | Define the Req/Cat functional |
| 58 |  |  |  | detailed fit |
| 59 | 103 | P313 |  | Resolve functional gaps for Req/Cat |
| 60 | 103 | P32 | 324 | Configure Req/Cat offering |
| 61 | 103 | P321 |  | Confirm and refine "Ives Team |
| 62 |  |  |  | Studio" for code tracking |
| 63 | 103 | P322 |  | Confirm and refine Req/Cat initial |

TABLE 4-continued

CHART OF SUMMARY AND DETAIL TASKS

| | Stage | Task ID | Step | Summary Tasks / Detail Tasks |
|---|---|---|---|---|
| 64 | | | | settings and organizational |
| 65 | | | | structure |
| 66 | 103 | P323 | | Confirm and refine Req/Cat |
| 67 | | | | authorizations |
| 68 | 103 | P324 | | Refine and validate final Req/Cat |
| 69 | | | | configuration |
| 70 | 103 | P33 | | Customize Req/Cat offering |
| 71 | 103 | P331 | | Validate and customize Req/Cat core |
| 72 | | | | application change request |
| 73 | 103 | P332 | | Refine and validate final |
| 74 | | | | customization for Req/Cat |
| 75 | 103 | P34 | | Produce custom Req/Cat programs |
| 76 | 103 | P341 | 276 | Validate and code bridge change |
| 77 | | | | requests (SAP and Req/Cat) |
| 78 | | P4 | | EDUCATION AND TRAINING |
| 79 | 102 | P41 | | Develop customer education and training |
| 80 | | | | strategy |
| 81 | 102 | P411 | | Validate customer education & |
| 82 | | | | training objectives |
| 83 | 102 | P412 | 190 | Define the training requirements |
| 84 | | | | and approach |
| 85 | 102 | P413 | | Confirm the education & training |
| 86 | | | | strategy |
| 87 | 102 | P42 | | Define system management processes |
| 88 | 102 | P421 | | Define SAP correction and transport |
| 89 | | | | process |
| 90 | 102 | P422 | | Define and agree on service level |
| 91 | | | | agreement SLA |
| 92 | 102 | P423 | | Define and administer SAP release |
| 93 | | | | control process |
| 94 | 102 | P424 | | Define Req/Cat transport process |
| 95 | 102 | P425 | | Define and administer version |
| 96 | | | | control process |
| 97 | 103 | P43 | 192 | Define user documentation and training |
| 98 | | | | requirements |
| 99 | 103 | P431 | | Define customer user audiences and |
| 100 | | | | requirements |
| 101 | 103 | P432 | | Confirm user documentation |
| 102 | | | | requirements and standards |
| 103 | 103 | P433 | | Conduct detailed end-user task |
| 104 | | | | analysis |
| 105 | 103 | P434 | | Assess user skills and training |
| 106 | | | | needs |
| 107 | 103 | P435 | | Validate end-user courses and |
| 108 | | | | content |
| 109 | 103 | P436 | | Identify users and course attendees |
| 110 | 103 | P437 | | Define and notify training |
| 111 | | | | attendees |
| 112 | 103 | P44 | | Develop user training documentation |
| 113 | 103 | P441 | | Produce customer specific end-user |
| 114 | | | | documentation |
| 115 | 103 | P442 | | Confirm training evaluation |
| 116 | | | | materials/approach with customer |
| 117 | 103 | P443 | 194 | Setup training system environment |
| 118 | 103 | P444 | | Validate training logistics |
| 119 | 103 | P445 | 198 | Conduct pilot training with super |
| 120 | | | | users |
| 121 | 103 | P446 | 196 | Arrange documentation and training |
| 122 | | | | material production |
| 123 | 103 | P45 | | Internal (Enterprise, service provider) |
| 124 | | | | training requirements |
| 125 | 103 | P451 | | Identify and organize appropriate |
| 126 | | | | internal training |
| 127 | 104 | P46 | | Conduct end-user training |
| 128 | 104 | P461 | | Conduct train-the-trainer sessions |
| 129 | 104 | P462 | 214,230 | Perform training |
| 130 | 104 | P463 | 212 | Conduct new buyer training |
| 131 | | P5 | | IMAGE |
| 132 | 103 | P51 | | Conduct image functional detailed fit |
| 133 | | | | gap analysis |
| 134 | 103 | P511 | | Define the image functional |
| 135 | | | | detailed fit |
| 136 | 103 | P512 | | Resolve image functional gaps |
| 137 | 103 | P52 | | Configure image offering |

TABLE 4-continued

CHART OF SUMMARY AND DETAIL TASKS

| | Stage | Task ID | Step | Summary Tasks / Detail Tasks |
|---|---|---|---|---|
| 138 | 103 | P521 | | Refine and validate final image |
| 139 | | | | configuration |
| 140 | 103 | P522 | | Confirm and refine image initial |
| 141 | | | | settings |
| 142 | | P6 | I/T | |
| 143 | 103 | P61 | | Establish customer network/computing |
| 144 | | | | infrastructure |
| 145 | 103 | P611 | | Confirm component delivery |
| 146 | 103 | P612 | | Establish network/computing |
| 147 | | | | hardware/software architecture |
| 148 | | | | infrastructure |
| 149 | 103 | P613 | | Ready network/computing environment |
| 150 | 103 | P62 | | Establish EDI infrastructure |
| 151 | 103 | P621 | | Establish EDI infrastructure |
| 152 | 103 | P622 | | Conduct trading partner testing |
| 153 | | | | (IT) |
| 154 | 102 | P623 | | Confirm EDI strategy |
| 155 | 102 | P6231 | | Setup image system environments |
| 156 | 103 | P6232 | | Establish cutover checklist and |
| 157 | | | | perform pre-cutover activities for |
| 158 | | | | image production environment |
| 159 | 104 | P6233 | | Validate image production support |
| 160 | | | | for system management |
| 161 | 103 | P63 | | Develop reporting infrastructure |
| 162 | 103 | P631 | | Develop reporting infrastructure |
| 163 | | | | (LIS/EIS) |
| 164 | 103 | P632 | | Develop DataMart extracts |
| 165 | 103 | P633 | 232 | Develop additional reports |
| 166 | | | | (customer/operations) |
| 167 | 102 | P64 | | Perform bridge architecture assessment |
| 168 | 102 | P641 | | Perform bridge architecture. |
| 169 | | | | integration point interfaces work |
| 170 | | | | session |
| 171 | 102 | P642 | 158 | Define bridge architecture project |
| 172 | | | | objectives document |
| 173 | 102 | P65 | | Validate bridge, EDI, vendor reporting |
| 174 | | | | requirements |
| 175 | 102 | P651 | 270 | Develop and manage bridge |
| 176 | | | | architecture implementation work |
| 177 | | | | plan |
| 178 | 102 | P652 | | Analyze EDI requirements |
| 179 | 102 | P653 | | Determine EDI communication |
| 180 | | | | environment |
| 181 | 102 | P654 | | Analyze vendor master data load |
| 182 | 102 | P655 | | Analyze operational reporting |
| 183 | | | | requirements |
| 184 | 102 | P656 | | Analyze customer requirements for |
| 185 | | | | DataMart implementation |
| 186 | 102 | P657 | | Schedule and conduct weekly |
| 187 | | | | interlock meeting |
| 188 | 102 | P658 | | Vendor lead client analysis |
| 189 | 102 | P66 | | Set up development/integration |
| 190 | | | | environment |
| 191 | 102 | P661 | | Set up SAP development/integration |
| 192 | | | | environment |
| 193 | 102 | P662 | | Set up Req/Cat system environments |
| 194 | 103 | P67 | | Set up consolidation/test environment |
| 195 | 103 | P671 | | Set up SAP consolidation/test |
| 196 | | | | environment |
| 197 | 104 | P68 | 218 | Set up production environment |
| 198 | 104 | P681 | | Convert vendor master into |
| 199 | | | | production environment |
| 200 | 104 | P682 | | Determine EDI tasks for production |
| 201 | | | | environment set up |
| 202 | 104 | P683 | | Execute SAP cutover checklist |
| 203 | 104 | P684 | | Set up SAP production environment |
| 204 | 104 | P685 | | Establish SAP batch schedule |
| 205 | 104 | P686 | | Set up trading partners in |
| 206 | | | | production environment |
| 207 | 104 | P687 | | Vendor lead client deployment |
| 208 | 103 | P688 | | Establish cutover checklist and |
| 209 | | | | perform pre-cutover activities for |
| 210 | | | | SAP production environment |
| 211 | 103 | P689 | | Establish cutover checklist and |

TABLE 4-continued

CHART OF SUMMARY AND DETAIL TASKS

| | Task ID | | Summary Tasks |
|---|---|---|---|
| Stage | | Step | Detail Tasks |

| | Stage | Task ID | Step | Detail Tasks |
|---|---|---|---|---|
| 212 | | | | perform pre-cutover activities for |
| 213 | | | | e-Req/Cat production environment |
| 214 | 105 | P69 | | Refine/execute production support for |
| 215 | | | | system management |
| 216 | 105 | P691 | 234 | Perform on-going support activities |
| 217 | | | | for Req/Cat |
| 218 | 105 | P692 | | Post deployment reporting support |
| 219 | 105 | P693 | | Develop new bridges and application |
| 220 | | | | extensions post go live |
| 221 | 105 | P694 | 236 | Support new EDI transactions post |
| 222 | | | | go live |
| 223 | 105 | P695 | | Execute system management security |
| 224 | | | | support procedures |
| 225 | 105 | P696 | | Execute data management support |
| 226 | | | | procedures |
| 227 | 105 | P697 | 236 | Execute EDI support procedures |
| 228 | 105 | P698 | | Execute system management |
| 229 | | | | operational support desk procedures |
| 230 | 105 | P699 | | Execute system management batch |
| 231 | | | | support desk procedures |
| 232 | 105 | P69A | | Execute system management SAPBI |
| 233 | | | | support procedures |
| 234 | 105 | P69B | | Execute system management master |
| 235 | | | | data support procedures |
| 236 | 105 | P69C | | Execute production support for |
| 237 | | | | system management |
| 238 | 103 | P6A | | Establish vendor master environment |
| 239 | 103 | P6A1 | | Establish vendor master |
| 240 | 103 | P6A2 | | Confirm vendor master |
| 241 | 103 | P6A3 | | ALE configuration for VLC |
| 242 | 103 | P6B | | Establish bridge architecture |
| 243 | | | | infrastructure environment |
| 244 | 103 | P6B1 | 272 | Develop detail architecture |
| 245 | | | | requirements definition |
| 246 | 102 | P6C | 274 | Validate system infrastructure |
| 247 | | | | requirements |
| 248 | 102 | P6C1 | 280 | Analyze current network/computing |
| 249 | | | | infrastructure |
| 250 | 102 | P6C2 | | Determine network/computing |
| 251 | | | | requirements for project |
| 252 | 102 | P6C3 | | Confirm and begin network/computing |
| 253 | | | | component acquisition |
| 254 | 102 | P6C4 | | Order and delivery of |
| 255 | | | | infrastructure components |
| 256 | | P7 | MARKETING | |
| 257 | 100 | P71 | | Participate in marketing procurement |
| 258 | | | | consulting engagement |
| 259 | 100 | P711 | 170 | Qualify potential client |
| 260 | 100 | P712 | | Qualify potential client e-Req/Cat |
| 261 | 100 | P713 | | Develop assessment statement of |
| 262 | | | | work (SOW) e-Req/Cat |
| 263 | 100 | P714 | | Develop assessment statement of |
| 264 | | | | work (SOW) |
| 265 | | P8 | PROCESS | |
| 266 | | | | |
| 267 | 102 | P81 | 156 | Customer process introduction |
| 268 | 102 | P811 | | Conduct customer introduction to |
| 269 | | | | Golden procurement and A/P |
| 270 | | | | processes |
| 271 | 102 | P82 | | Process reviews with customer - |
| 272 | | | | procurement and A/P |
| 273 | 102 | P821 | 344 | Review procurement processes with |
| 274 | | | | customer |
| 275 | 102 | P822 | 342 | Review A/P processes with customer |
| 276 | 102 | P83 | | Assess customer impact on internal |
| 277 | | | | Enterprise workload |
| 278 | 102 | P831 | | Identify current and potential |
| 279 | | | | supplier catalogs for customer |
| 280 | 102 | P832 | 340 | Perform assessment of customer |
| 281 | | | | purchasing business |
| 282 | 103 | P84 | | Process alignment customer/Golden |
| 283 | 103 | P841 | | Determine GAPs between customer and |
| 284 | | | | golden processes |
| 285 | 103 | P842 | | Perform process GAP resolution |

TABLE 4-continued

CHART OF SUMMARY AND DETAIL TASKS

| | Stage | Task ID | Step | Summary Tasks / Detail Tasks |
|---|---|---|---|---|
| 286 | 103 | P85 | | BMP process and procedures management |
| 287 | 103 | P851 | | Codes and procedures |
| 288 | 103 | P852 | 348 | Update and review process |
| 289 | | | | management & procedures manual |
| 290 | 103 | P86 | | Supplier readiness |
| 291 | 103 | P861 | 210 | General supplier introduction |
| 292 | 103 | P862 | | Manage trading partner - EDI |
| 293 | | | | suppliers |
| 294 | 103 | P863 | 346 | Establish ASAP suppliers for |
| 295 | | | | customer (ASAP = a SAP supplier not |
| 296 | | | | requiring a buyer) |
| 297 | 103 | P864 | | Manage customer supplier outline |
| 298 | | | | agreements |
| 299 | 103 | P865 | | Customer freight procedures |
| 300 | 104 | P866 | | Supplier memo mailing |
| 301 | | P9 | | PROJECT MANAGEMENT |
| 302 | 102 | P91 | 180 | Initiate project planning |
| 303 | 102 | P911 | 160 | Confirm project scope and |
| 304 | | | | implementation strategy |
| 305 | 102 | P912 | | Confirm project organization and |
| 306 | | | | assign resources to roles |
| 307 | 102 | P913 | | Prepare and validate project plan |
| 308 | | | | and procedures |
| 309 | 102 | P914 | | Establish project team working |
| 310 | | | | environment |
| 311 | 102 | P915 | | Orient project team |
| 312 | 102 | P92 | 150 | Confirm and refine project management |
| 313 | | | | standards and procedures |
| 314 | 102 | P921 | | Confirm and refine issue management |
| 315 | | | | plan |
| 316 | 102 | P922 | | Confirm and refine project |
| 317 | | | | documentation |
| 318 | 102 | P923 | 152 | Confirm and refine quality |
| 319 | | | | assurance standards |
| 320 | 102 | P924 | | Create team building plan |
| 321 | 102 | P93 | | Confirm implementation strategies |
| 322 | 102 | P931 | | Confirm system configuration |
| 323 | | | | standards |
| 324 | 103 | P9311 | | Customize image offering |
| 325 | 103 | P9312 | | Validate and customize image core |
| 326 | | | | application change request |
| 327 | 103 | P93121 | | Refine and validate final |
| 328 | | | | customization for image |
| 329 | 102 | P932 | | Confirm CR/PTR process |
| 330 | 102 | P933 | | Confirm testing strategy |
| 331 | 102 | P934 | | Confirm production support & |
| 332 | | | | operations strategy |
| 333 | 102 | P935 | | Confirm SAP production system |
| 334 | | | | management strategy |
| 335 | 102 | P936 | | Confirm e-Req/Cat production system |
| 336 | | | | management stategy |
| 337 | 102 | P937 | 282 | Confirm network/computing strategy |
| 338 | 102 | P938 | | Confirm vendor conversion strategy |
| 339 | 102 | P94 | 162 | Prepare project team |
| 340 | 102 | P941 | | Conduct kick-off meeting |
| 341 | 102 | P942 | | Conduct project team standards |
| 342 | | | | meeting |
| 343 | 102 | P943 | | Conduct project team training |
| 344 | 102 | P95 | 352 | Define production support plans |
| 345 | 102 | P951 | | Define system management SAP |
| 346 | | | | resource requirements |
| 347 | 102 | P952 | | Define system management e-Req/Cat |
| 348 | | | | resource requirements |
| 349 | 102 | P953 | | Define production support accounts |
| 350 | | | | payable plan |
| 351 | 102 | P954 | | Define production support CSC plan |
| 352 | 102 | P955 | | Define production support general |
| 353 | | | | procurement plan |
| 354 | 102 | P956 | | Confirm SAP system authorizations |
| 355 | | | | for project team |
| 356 | 102 | P957 | | Confirm Req/Cat access control list |
| 357 | | | | (ACL) |
| 358 | 102 | P958 | | Define system management image |
| 359 | | | | resource requirements |

TABLE 4-continued

CHART OF SUMMARY AND DETAIL TASKS

| | Stage | Task ID | Step | Summary Tasks / Detail Tasks |
|---|---|---|---|---|
| 360 | 102 | P96 | | Initial quality assurance review |
| 361 | 102 | P961 | | Initial QA review |
| 362 | 103 | | | |
| 363 | &104 | P97 | | Review project status and refine project |
| 364 | | | | plan |
| 365 | 103, | | | |
| 366 | &104 | P971 | | Conduct project team status |
| 367 | | | | meetings |
| 368 | 103 | | | |
| 369 | &104 | P972 | | Conduct steering committee meetings |
| 370 | 101 | P98 | | Obtain customer approval |
| 371 | 102 | P981 | | Won bid analysis/transition to |
| 372 | | | | implementation team |
| 373 | 102 | P982 | | Won bid analysis/transition to |
| 374 | | | | implementation team e-Req/Cat |
| 375 | 101 | P983 | | Conduct lost bid analysis |
| 376 | 101 | P984 | | Conduct lost bid analysis e-Req/Cat |
| 377 | 104 | P99 | | Validate production support |
| 378 | 104 | P991 | | Validate SAP production support for |
| 379 | | | | system management |
| 380 | 104 | P992 | | Validate production support for |
| 381 | | | | accounts payable |
| 382 | 104 | P993 | | Validate production support for CSC |
| 383 | 104 | P994 | | Validate production support for |
| 384 | | | | general procurement |
| 385 | 104 | P995 | | Validate Req/Cat production support |
| 386 | | | | for system managment |
| 387 | 105 | P996 | | Validate education & training |
| 388 | | | | production support activities |
| 389 | 104 | P9A | | Perform go live project office |
| 390 | | | | activities |
| 391 | 104 | P9A1 | | Ensure go live check lists |
| 392 | | | | activities |
| 393 | 104 | P9A2 | | Go/no-go decision for go live |
| 394 | 103 | | | |
| 395 | &104 | P9B | | Interim quality assurance reviews |
| 396 | 103 | | | |
| 397 | &104 | P9B1 | | Interim QA reviews |
| 398 | 105 | P9C | 244 | Post-implementation quality assurance |
| 399 | | | | review |
| 400 | 105 | P9C1 | | Post-implementation QA review |
| 401 | 105 | P9D | | Production support review |
| 402 | 105 | P9D1 | | Confirm production environment |
| 403 | | PA | REQ/CAT | |
| 404 | 102 | PA1 | | Identify customer responsibilities for |
| 405 | | | | Req/Cat |
| 406 | 102 | PA11 | | Identify country/global |
| 407 | | | | administrators & neg. con person |
| 408 | 102 | PA12 | | Perform country administrator |
| 409 | | | | education |
| 410 | 103 | PA2 | | Prepare and load Req/Cat catalog data |
| 411 | 103 | PA21 | | Perform Req/Cat catalogue tasks |
| 412 | 104 | PA3 | | Req/Cat production readiness |
| 413 | 104 | PA31 | | Confirm Req/Cat for production |
| 414 | | | | environment |
| 415 | 104 | PA32 | | Set up Req/Cat tables in production |
| 416 | 104 | PA33 | | Prepare Req/Cat production copy |
| 417 | 104 | PA34 | | Execute Req/Cat go live checklist |
| 418 | | PB | SAP | |
| 419 | 103 | PB1 | 254 | Conduct SAP functional detailed fit gap |
| 420 | | | | analysis |
| 421 | 103 | PB11 | 250 | Confirm SAP organizational |
| 422 | | | | hierarchy |
| 423 | 103 | PB12 | | Define the SAP functional detailed |
| 424 | | | | fit |
| 425 | 103 | PB13 | | Resolve SAP functional gaps |
| 426 | 103 | PB2 | | Produce custom SAP programs |
| 427 | 103 | PB21 | | Develop and validate SAP custom |
| 428 | | | | programs |
| 429 | 103 | PB3 | 252 | Configure SAP offering |
| 430 | 103 | PB31 | | Confirm and refine implementation |
| 431 | | | | guide |
| 432 | 103 | PB32 | | Confirm and refine SAP initial |
| 433 | | | | settings and organizational |

TABLE 4-continued

CHART OF SUMMARY AND DETAIL TASKS

| | Stage | Task ID | Step | Summary Tasks / Detail Tasks |
|---|---|---|---|---|
| 434 | | | | structure |
| 435 | 103 | PB33 | | Confirm and refine SAP end user |
| 436 | | | | authorization profiles |
| 437 | 103 | PB34 | | Refine and validate final SAP |
| 438 | | | | configuration |
| 439 | 103 | PB4 | | Customize SAP offering |
| 440 | 103 | PB41 | | Validate and customize SAP core |
| 441 | | | | application change request |
| 442 | 103 | PB42 | | Refine and validate final |
| 443 | | | | customization for SAP |
| 444 | | PC | TESTING | |
| 445 | 103 | PC1 | 256,260,322 | Perform preparation activities for |
| 446 | | | | testing (both Req/Cat and SAP) |
| 447 | 103 | PC11 | | Confirm and refine test case |
| 448 | | | | templates |
| 449 | 103 | PC12 | 258,326 | Build comprehensive test plan |
| 450 | 103 | PC13 | | Develop test environment plan |
| 451 | 103 | PC14 | | Create test case specifications |
| 452 | 103 | PC15 | | Build/reuse test cases |
| 453 | 103 | PC16 | | Determine testing tools |
| 454 | 103 | PC17 | | Review and validate comprehensive |
| 455 | | | | test plan |
| 456 | 103 | PC2 | 216 | Perform comprehensive testing |
| 457 | 103 | PC21 | | Perform unit test |
| 458 | 103 | PC22 | 262 | Perform component test |
| 459 | 103 | PC23 | 264,328 | Perform integration test |
| 460 | 103 | PC24 | | Administer network/computing |
| 461 | | | | performance monitoring |
| 462 | 103 | PC25 | 266,330 | Perform system test |
| 463 | 103 | PC26 | 220 | Perform user acceptance test |
| 464 | 103 | PC27 | | Perform other required testing |
| 465 | 103 | PC271 | | Support comprehensive image testing |
| 466 | 103 | PC28 | | Support comprehensive e-Reg/Cat |
| 467 | | | | testing |
| 468 | 103 | PC29 | | Support comprehensive SAP testing |
| 469 | 103 | PC2A | | Support comprehensive image testing |
| 470 | | PD | TRANSITION MANAGEMENT | |
| 471 | 101 | PD1 | 172 | Introduce transition management |
| 472 | | | | (assessment) |
| 473 | 101 | PD11 | 172 | Develop initial assessment of |
| 474 | | | | client |
| 475 | 101 | PD12 | | Provide transition management |
| 476 | | | | workshop presentation |
| 477 | 102 | PD2 | 154 | Model transition management (project |
| 478 | | | | preparation) |
| 479 | 102 | PD21 | | Provide transition management |
| 480 | | | | strategy |
| 481 | 102 | PD22 | | Evaluate cultural impact of |
| 482 | | | | solution |
| 483 | 102 | PD23 | 300 | Develop/confirm transition |
| 484 | | | | management plan |
| 485 | 102 | PD3 | | Develop communication plan (project |
| 486 | | | | preparation) |
| 487 | 102 | PD31 | 304 | Build/confirm campaign plan |
| 488 | 102 | PD32 | 302 | Update communications trategy |
| 489 | 102 | PD33 | | Deliver announcement/kickoff |
| 490 | | | | communication |
| 491 | 103 | PD4 | | Initialize transition management (design |
| 492 | | | | and development) |
| 493 | 103 | PD41 | | Create incentive/reward program |
| 494 | 103 | PD42 | | Assess supplier impacts related to |
| 495 | | | | transition management |
| 496 | 103 | PD43 | | Assess Enterprise support impacts |
| 497 | | | | related to transition management |
| 498 | 103 | PD44 | | Design detail go live |
| 499 | | | | material/activities |
| 500 | 103 | PD45 | 308 | Create policy changes |
| 501 | 103 | PD46 | | Identify/plan for security |
| 502 | 103 | PD47 | | Detail process transition plan |
| 503 | 103 | PD48 | 306 | Detail human resources plan |
| 504 | 103 | PD49 | | Detail employee relations plan |
| 505 | 104 | PD5 | | Ensure transition management activities |
| 506 | | | | (deploy) |
| 507 | 104 | PD51 | 350 | Ensure new process management |

TABLE 4-continued

CHART OF SUMMARY AND DETAIL TASKS

|  | Stage | Task ID | Step | Summary Tasks / Detail Tasks |
|---|---|---|---|---|
| 508 |  |  |  | system in place |
| 509 | 104 | PD52 | 222 | Perform client readiness assessment |
| 510 | 104 | PD53 |  | Perform transition management go |
| 511 |  |  |  | live activities |
| 512 | 104 | PDS4 | 240 | Manage human resources activities |
| 513 | 105 | PD6 |  | Communication (support) |
| 514 | 105 | PD61 |  | Thanks to users/suppliers |
| 515 | 105 | PD7 |  | Validate transition management (support) |
| 516 | 105 | PD71 |  | Monitor human resource issues |
| 517 | 105 | PD72 |  | Assess effectiveness of transition |
| 518 |  |  |  | management program |
| 519 | 105 | PD8 |  | Perform post implementation survey |
| 520 |  |  |  | (support) |
| 521 | 105 | PD81 | 242 | Administer post go live survey |
| 522 | 105 | PD82 |  | Present and act upon survey |
| 523 |  |  |  | findings |
| 524 |  | PE | NOT CATEGORIZED |  |
| 525 | 104 | PE1 | 200 | Perform go live process activities |
| 526 | 104 | PE11 |  | Allocate buyer codes to commodities |
| 527 | 104 | PE12 |  | Enter blanket orders |
| 528 | ... | PE2 |  | Table template document |
| 529 | ... | PE21 |  | Table template document |

Project Assessment 101

Referring to FIG. 3 in connection with FIG. 2, project assessment phase 101 follows pre-sales phase 100, during which marketing makes its initial contact with the prospective client, or customer.

After initial contact from marketing 118, the main thrust of Assessment Project 101 is to provide an integrated, cross-functional customer solution to the client. An assessment team is led by the Business Office 120, but requires input and participation from the project leaders of Architecture 122, Transformation Management 136, Business Process 112, EDI 114, and Application Development 116.

Assessment 101 begins with a complete review of the client's current general procurement and accounts payable processes. This includes debriefing the initial marketing team 118, instructing the project leaders 126, and accumulating all other relevant data available about the client's processes, tools, and organizational structures. The Assessment Team then defines an integrated customer solution that covers technical, educational, and Human Resource issues.

The delivery of the Workshop is intended to present an overview of the customer solution, initiate discussions on process analysis and strategic implementation, and confirmation of the solution fit. Specific goals of a workshop phase within assessment stage 101 include the following:

(1) Prepare and deliver a presentation to the customer defining the service offering, including any essential documentation on the offering, and a demonstration of the end-user tool(s), as applicable.
(2) Collect area specific information and customer requirements on network process sourcing, procurement, accounts payable, and finance; and EDI, I/T, and transition management.
(3) Identify high level gaps in each such area.
(4) Identify additional high level requirements for new process support, and for conversion requirements, including requirements for commodity structure, account structure, vendor, and contracts.
(5) Identify interface requirements, including requirements for HR, cost center, catalogs, ledger, information warehouse.
(6) Validate accounting for project, appropriation, contract, job, tax reporting, currency, and check reconciliation.
(7) Identify requirements for network, EDI, testing, and application development including new reports, new interfaces, and new features.
(8) Assemble a high-level gap analysis.
(9) Create a high-level Customer Scope Document.
(10) Confirm the recommended solution.

At the completion of the workshop phase, the assessment team 106 convenes to develop and cost the final customer solution and proposal. At this time, the members of assessment team 106 assemble, understand, and validate the collected data; review standard proposal options with assumptions and identify items that apply to this client; create a draft of the proposal including scope, risk, schedule, and resources; review the draft with team and other project members to obtain sizing and costing information for each area; compile costing information to add to the proposal; and perform QA review of the system integration, application development, managed operations (including service delivery center (SDC), application IT, and Process Operations) proposals, and of the overall proposal.

The resulting proposal is delivered or presented to the client. Final Assessment activities include follow up query responses and, should the proposal be declined, a loss analysis. This loss analysis feeds back into assessment process 101 to improve its overall effectiveness and efficiency.

Referring to Table 4, summary tasks pertaining to assessment stage 101 are listed, together with included detail tasks. For each task, a template 440 or 520 is maintained in data base 70, and accessed by team 108 members and others through summary view 400 to track progress (including viewing, updating, sharing, and approving) during this assessment stage 101.

Project Preparation 102

Referring further to FIG. 3, project preparation stage 102 sets up the project, initializes detail planning, and models the plan for making the transition from the client's legacy system and process to the new system and process (or, offering).

A critical element of this stage is to ensure resources are assigned to transition management 136, both from the project implementation team 126 as well as from the client. During this stage the transition activities required for a smooth migration from the old client process and system to the new service offering are modeled. The result is a detailed transition management plan that is specifically designed for the client. Stage 102 tasks and deliverables include the following:

(1) Perform analysis on the client HR environment, including organization structure and relationships, labor relations, management, administration, and end user roles and responsibilities, and the general HR environment.

(2) Develop and approve the detailed transition management and communication plan.

(3) Update the client specific transition management strategy.

(4) Define the quality assurance (QA) process required to assure that a project conforms to documented standards and meets documented requirements. The purpose of this task is to confirm the quality assurance standards between Enterprise and the client, and identifies the tasks that are to be audited by the Enterprise Technical Center.

The QA review is a beneficial process for the project as it timely recognizes potential risk areas and reduces the possibility of project delays while achieving faster implementation, attaining low cost and increasing the customer's level of confidence. Deliverables of the QA review task include the following:

(1) Confirm and refine quality assurance standards with the customer.

(2) Confirm that technical requirements can be met.

(3) Confirm that business and financial measurements can be met.

(4) Confirm that the proposal is complete and the required processes have been followed.

(5) Establish QA schedule for the project.

Integration of all critical Enterprise and client team members provides the glue to assure a smooth project. By completing the detailed tasks within project preparation stage 102, the recommended implementation standards, procedures and strategies for the project are shared with the technical and business functional members of the project team as well as with the customer. All team members have input in this process, and understand the basic procedures, once they have been agreed to. These procedures, documented in summary and detail task templates listed in Table 4, include the following:

Configuration Standards
CR/PTR Process
Testing Strategy
Production Support and Operations Strategy
SAP System Management Strategy
Req/Cat System Management Strategy
Network Computing Strategy
Vendor Conversion Strategy

Project Design and Development 103

Referring further to FIGS. 3, project design and development phase 103 provides and documents in a database of templates referred to as a Playbook, the business controls, transformation management, and SAP and Req/Cat customization required for an integrated approach to a complete customer solution.

During this stage 103, business controls 132 provides a comprehensive process that identifies key control points and establishes detailed procedures to assure a quality installation. The deliverables include documentation, separation of duties, sensitive programs, logical access control, logging (audit trail), change control for tables, change control for programs, system testing, input controls, processing controls, error handling controls, output controls, balancing and reconciliation, vital records and disaster recovery, records management, reports, local area network (LAN), and country specifics, as described below:

(1) Documentation: an assessment of the quality and completeness of existing program documentation and a determination of the degree to which programs could be efficiently reconstructed if they were destroyed.

(2) Separation of duties: the duties of the programmer, computer operations, and user groups are reviewed to ensure that separation of duties problems do not exist. No one individual can control activities within a process (or any event in a string of events) in a way that permits errors of omission, or commission of fraud, theft, etc., to go undetected.

(3) Sensitive programs: controls must be in place to prevent unauthorized modification and/or use of the application.

(4) Logical access control: while programs are generally controlled by a site procedure, application data has a formal access control mechanism.

(5) Logging (audit trail): a logging mechanism is established to ensure the audit trail is correct.

(6) Change control (tables): a change control system is put in place to evaluate, justify and control changes to tables.

(7) Change control (programs): a change control system is put in place to evaluate, justify and control changes to programs.

(8) System Testing: system testing procedures are effectively planned and carried out to ensure that controls are successfully tested and documented.

(9) Input controls: to insure accuracy and completeness of information entering an application.

(10) Processing controls: controls are applied for entry of data into the computer application system that ensure accuracy and completeness of data during computer processing.

(11) Error handling controls: controls for error handling and reprocessing of transactions.

(12) Output controls: output controls ensure the integrity of the output data from conclusion of computer processing to delivery to the user.

(13) Balancing and reconciliation: verifies that procedures to reconcile output to input are effective.

(14) Vital records and disaster recovery: disaster recovery is designed to provide for the continuity or rapid system restoration of a business process immediately following a natural or man-made emergency or disaster.

(15) Records management: verify that information is managed with sound business practices and controls.

(16) Reports: verify that reports are distributed properly.

(17) Local Area Network (LAN): Refer to ITCS 201, "Security Standards for Local Area Networks and Distributed Computing."

(18) Country specifics: verifies that any questions particular to this specific country are completed.

Req/Cat is a requisition and catalog product designed, developed, and maintained by Enterprise for use in systems such as those developed in this stage 103.

SAP is an financial and accounting package which an enterprise or company may license for its own use and for its customers. SAP configurators that customize package programs to fit the needs of the client are provided for use during design and development stage 103. All other installations of SAP are "off the shelf", with the client changing its internal structures to fit SAP requirements.

Transition management is the most overlooked part of any implementation process. It is critical to address the corporate culture and personality at the earliest contact. Strategic and tactical plans may then be developed that guide the implementation through "Go Live" and for an agreed period thereafter. The purpose of transition management steps of the design and development stage 103 is to provide guidance to the development team members as they work with the client to institute policy changes that might be introduced as part of the implementation of the new process and system. Necessary changes to the legacy system are identified and a plan developed to announce and introduce changes in policy. Policy change includes key business rules that are part of the management system for purchasing and procurement. They may be associated with approval levels or procedural changes in the new system. The target is not the day to day operation but management decision and support systems that might be affected. The areas addressed include:

Measurements (old and new)

Management system

Approval levels

Supplier contacts and contracts

Reward systems

Incentive Plans

Security

Employee and user changes

All of these areas require strategic and tactical planning that includes the following steps:

(1) Identify the current (legacy) system or process and compare it to the new process or system to be implemented to identify gaps.

(2) Develop specific recommendations for gaps between the legacy and the new system or process, identifying the level of sensitivity and whether or not action is required as part of the transition.

(3) Determine the announcement and transition (or, cut over) date for each action identified.

(4) Design a communications plan to build the message and media for communicating the changes to affected parties.

(5) Design a process transition plan to ensure the elements of change are integrated into the overall plan for the process.

(6) Determine how the policies must be modified according to new standards and procedures (7) Determine what new policies and procedures will be implemented as part of the process and system.

Finally, integration of the above design and development stage 103 process steps along with the technical teams involved allow the delivery of a cross-functional solution under one unified and managed plan.

Project Deployment 104

Referring again to FIG. 3, project deployment phase 104 uses the Playbook to improve deployment of (1) quality, or application systems control and auditability (ASCA), (2) transition management, and (3) integrated project management systems and procedures.

1. Quality (ASCA)

A business controls team provides dedicated resources throughout the life cycle of the project. During the project development stage 103, this team has planned and executed an ASCA self-assessment that has covered an extensive list of technical, business, financial, and client issues. In this deployment stage 104, its members are responsible for managing an independent audit that will cover the same areas. The independent auditors then issue an acceptance position that is required before the client can "Go Live" with the new system and process. Deployment stage 104 activities include:

(1) Create the project plan for ASCA Review preparation activities.

(2) Determine which Enterprise organization will conduct the ASCA and business controls review.

(3) Prepare all ASCA documentation required for the review.

(4) Prepare all sub-process overviews and descriptions of process flow.

(5) Ensure the test plan includes those elements of the ASCA checks required to ensure business controls, separation of duties, and authorization matrices, data integrity and security.

(6) Create, update and complete all required documents of understanding (DOU's) & service level agreements (SLA's).

(7) Ensure the separation of duties matrix (SOD) is current at time of final review.

(8) Review all testing and obtain test approvals.

(9) Ensure all approvals have been obtained and signed approval forms available for ASCA Review. These include approvals for process ownership, ASCA requirements, self-assessment and system cutover.

2. Integrated Project Management

During this deployment stage 104, project manager 126 has the task to validate and confirm that all checklists and status are acceptable prior to Go-live. This includes the readiness of all aspects of the project, and once satisfied, a review is conducted and the customer's formal sign-off for Go-live is obtained. Status transition management and client readiness assessment and confirmation activities include verification that:

(1) No critical open issues exist in any area.

(2) All relevant aspects of readiness have been included in the status check.

(3) Network and computing performance testing is complete.

(4) System test is complete.

(5) User acceptance test is complete.

(6) System management production environment Go-live checklist is complete.

(7) Any needed CR's and PTR's have been generated.

(8) Production support is in place.

(9) Supplier readiness is reviewed and accepted.

(10) Service provider readiness is confirmed.

(11) Enterprise GP readiness is confirmed.

(12) Review of the compiled check information is completed.

(13) Customer sign-off on the Go-Live decision is obtained.

3. Transition Management

A transition management team prepares for the deployment, or "Go Live" of the client solution. During this deployment stage 104 in the project, virtually all technical problems are resolved and systems configured. The client is now ready to deploy and the human factors must be aggressively managed to assure a smooth transition from the legacy systems to the improved client solution. Transition management activities within deployment stage 104 ensure that organization, measurements, management, support, and labor relations functions are developed, explained, reviewed, understood, in place or on schedule, as appropriate.

(1) Organization: organizational changes for Go-Live, updated communications plans, feedback mechanism for persons displaced by changes in organization, and the new organization.
(2) Measurements: changes in measurement system, plan to cut over to the new measurements, and communications explaining the new measurements, including how they are derived, how they are used and their importance to the business.
(3) Management: changes in management or management responsibilities, communications explaining the changes in management structure, and why it is important to the clients' organization, the management chain and path for escalation of issues, normal business reports and their use.
(4) Support: support structure for both client and technical support.
(5) Labor Relations: activities associated with the loss of a job role, plan to notify the affected people, communication plan for providing information to remaining employees on the reasons for the changes and for fostering support for the new process.

Integration of the cross-functional teams to accomplish the deployment of the customer solution is facilitated by use of the system and data base structure of the preferred embodiment of the invention.

Ongoing Project Support 105

Referring further to FIG. 3, project support stage 105 enables project teams, all of which have continuing responsibilities with the client after "Go Live", to provide the required ongoing support. As with all other stages, integration of the teams through the use of the systems and methods provided by the invention, including transition management systems and methods, is greatly facilitated. It is a characteristic of the preferred embodiment that each of these areas has specific predetermined plans, actions and responsibilities, and these are audited and tracked through a GP/AP development and deployment system.

During support stage 105, transition management 136 delivers an approved detailed questionnaire with quality questions in a logical format that allows end-users to express their opinion and provide information that meets the survey objective. Support stage 105 includes a plan for communicating the survey results to the participants and taking action in response to the survey results. This stage also incorporates a continuing education plan for training new employees as well as continually updating the material so that reflects the latest version of the application.

The survey in stage 105 is structured to determine the end users' perception of the new system, system ease of use, response time from both the system and CSC (Customer Service Center), and customer knowledge level of processes and product. Results of the survey are compiled and presented to the client and Enterprise Management Teams along with action plans, time tables, expected results for approval, and implementation. A Lessons Learned document is reviewed with the project team and appropriate adjustments made for future engagements.

Project Manager 126 provides a quality function task after "Go Live". This task aims at checking the implementation of the EPS Offering to determine if anything needs special attention or focus. It is also the formal sign-off on the final delivery of the implementation by the customer. Its deliverables include:
(1) Customer accepts delivery of the EPS general procurement offering implementation and signs off.
(2) Action list on issues and CR/PTR's, if applicable.
(3) Formal transition of operational responsibility to operations 98 and support management 96.
(4) Preliminary business benefits evaluation.

The Req/Cat and SAP technical teams 128, 138 provide ongoing reviews and improvements to the client's process through the CR and PTR processes. These are formalized, documented processes with management controls to attain cost, schedule, and customer objectives.

As part of the new business process, support center 94 is established to provide long term assistance in any area of the application solution. This includes communication of feedback, real time application assistance, and special requests for problems concerning data.

It is the planned integration of these multi-functional teams that provides an innovative solution to the customer.

Representative Path Implementation of Assessment Stage 101

Figure 3A:
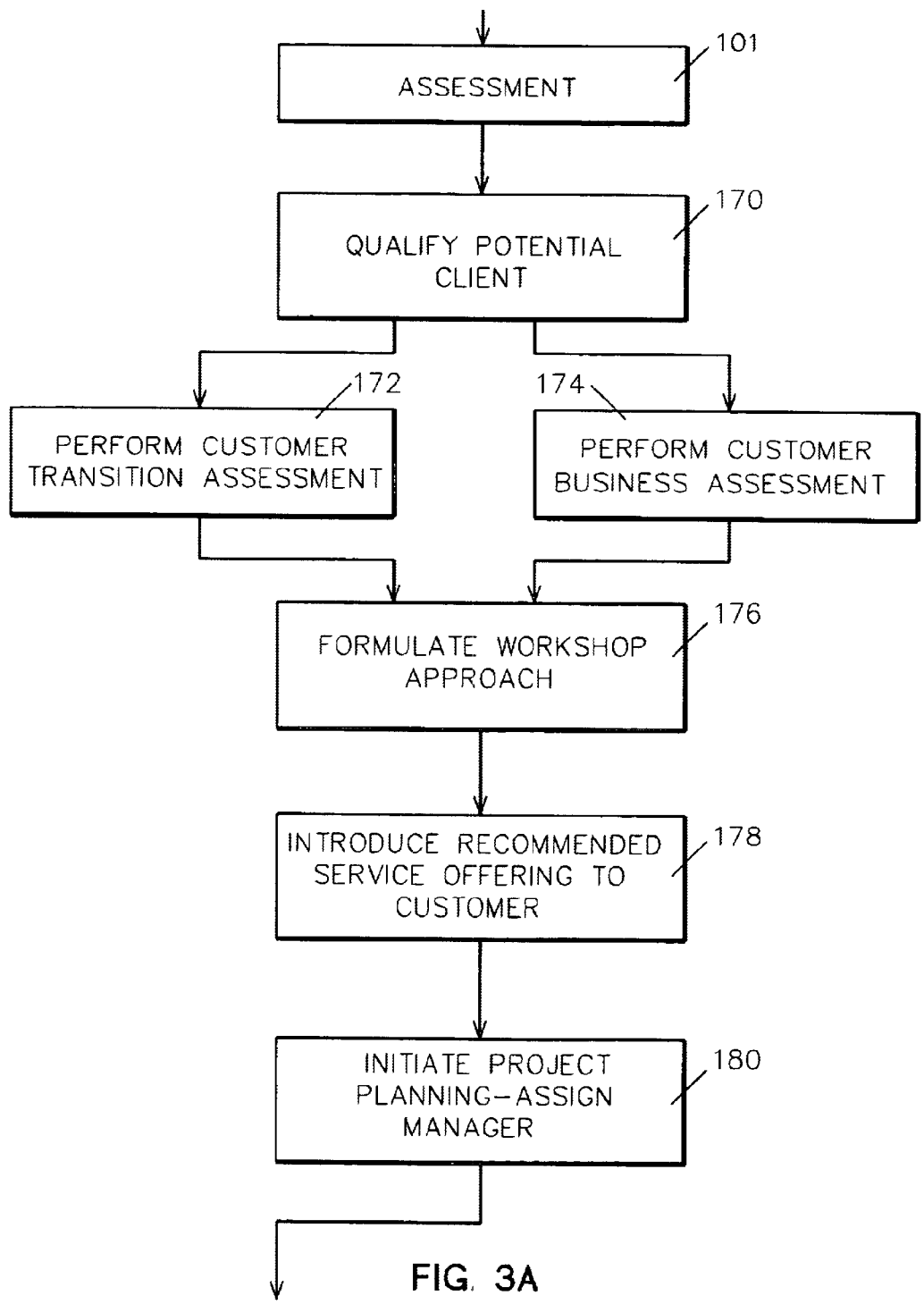
Figure 3B:
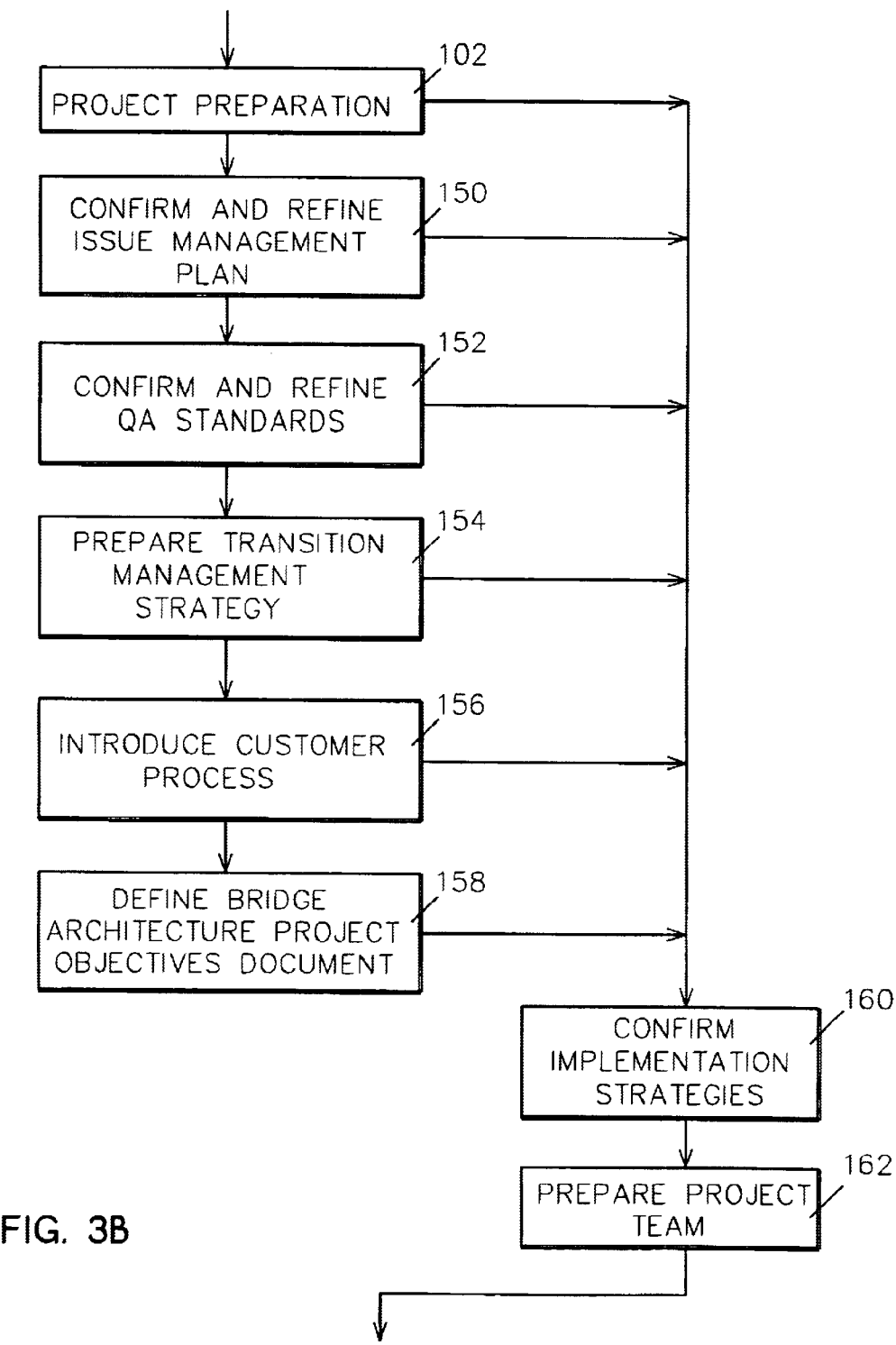
Figure 3C:
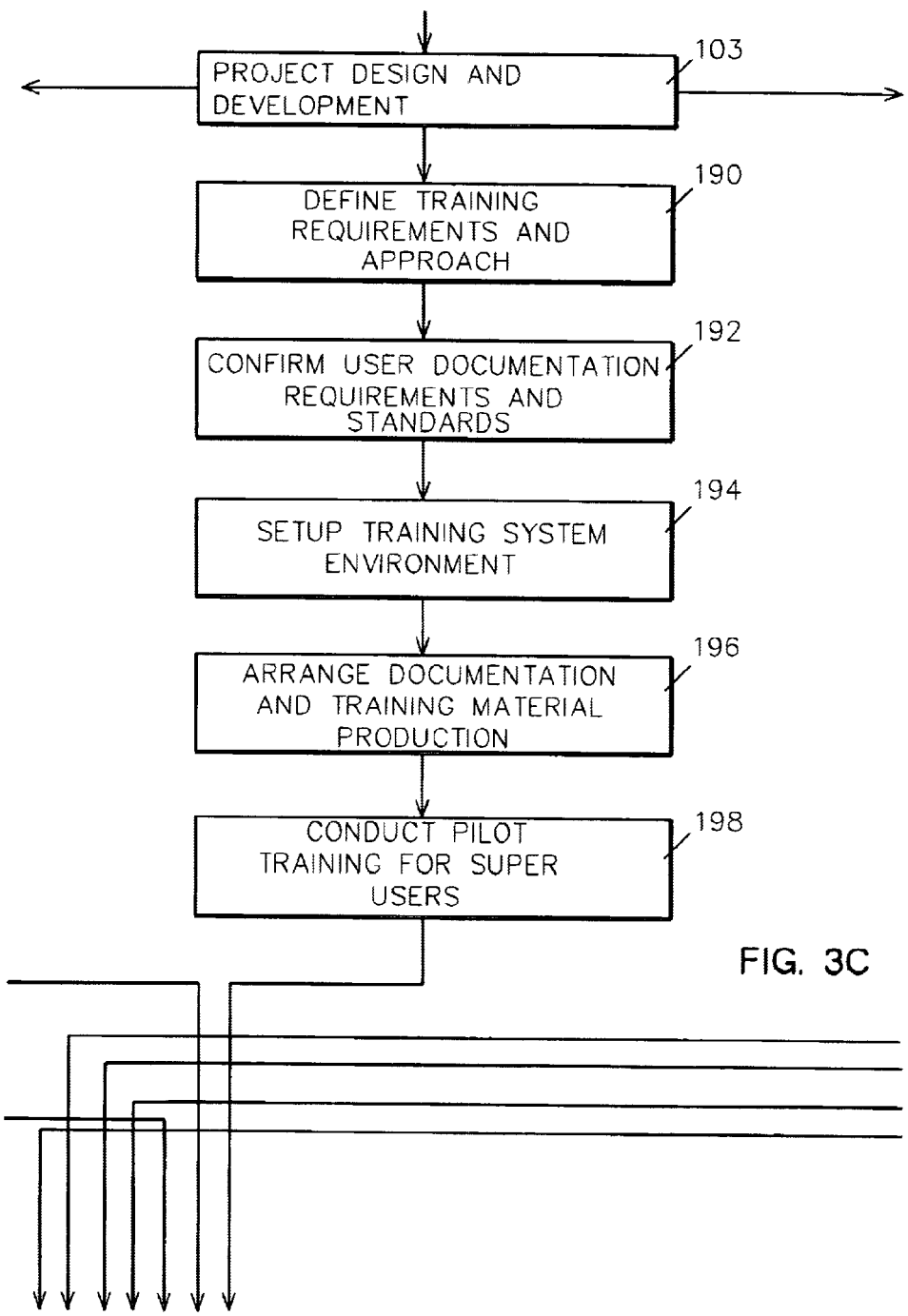
Figure 3D:
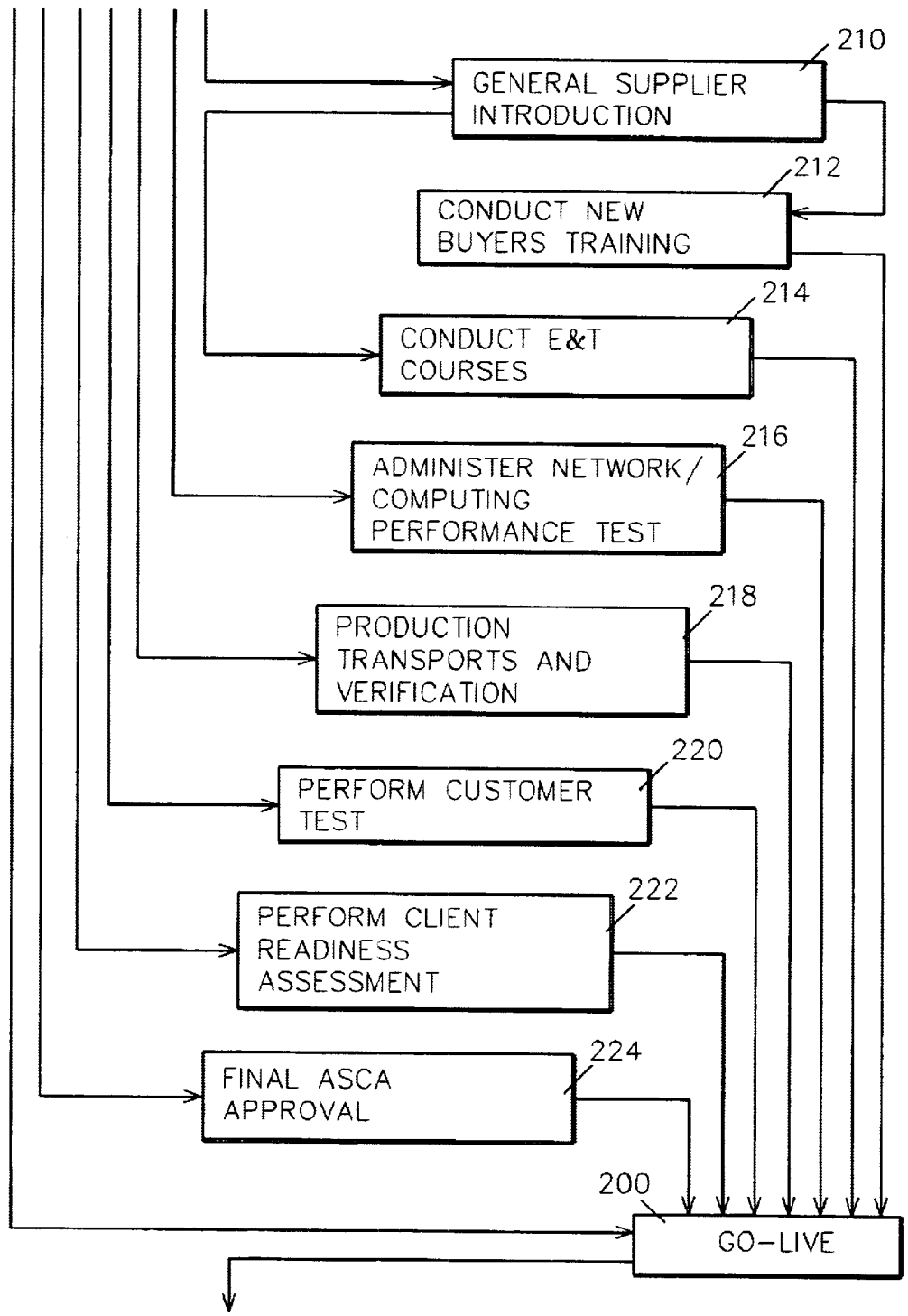
Figure 3E:
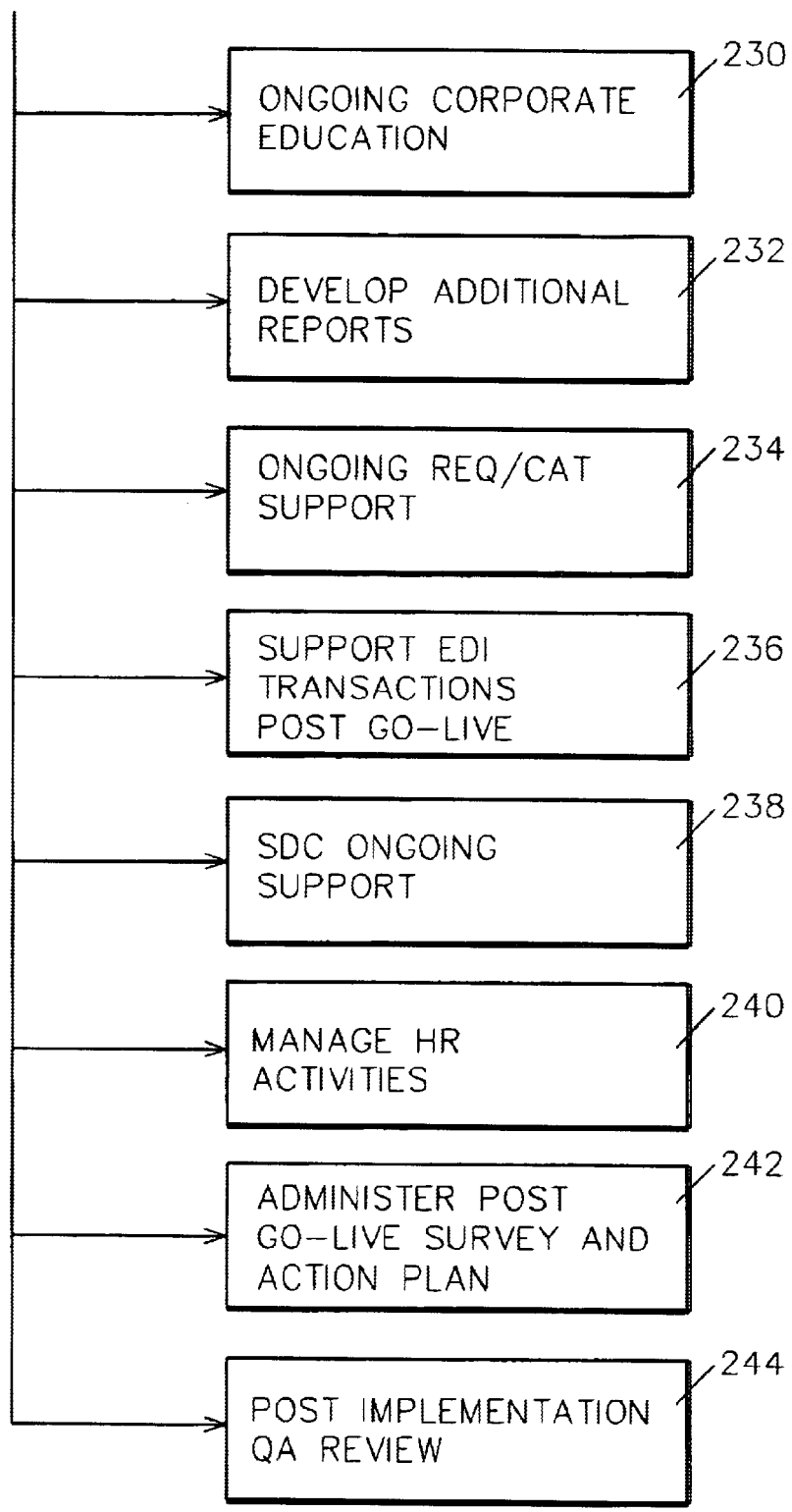
Figure 3F:
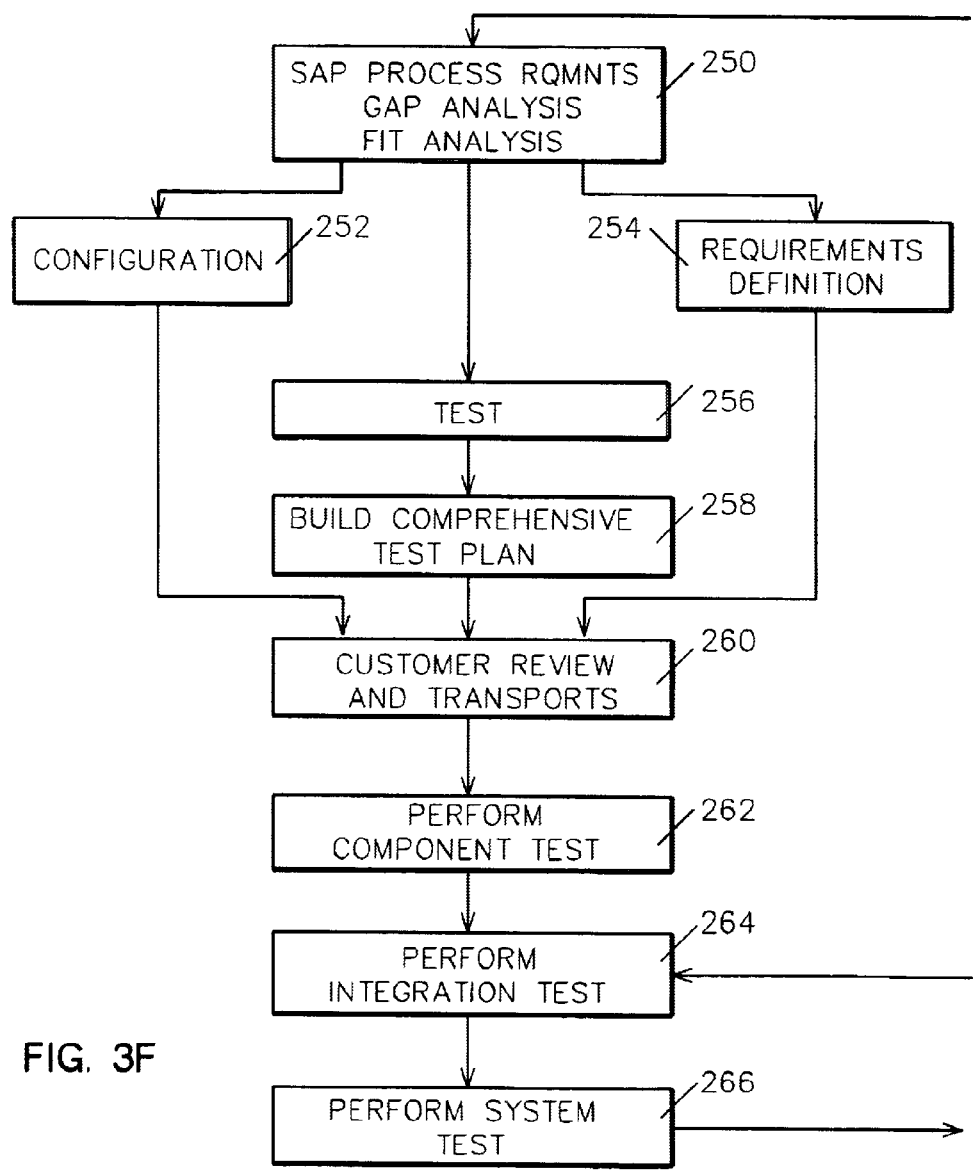
Figure 3G:
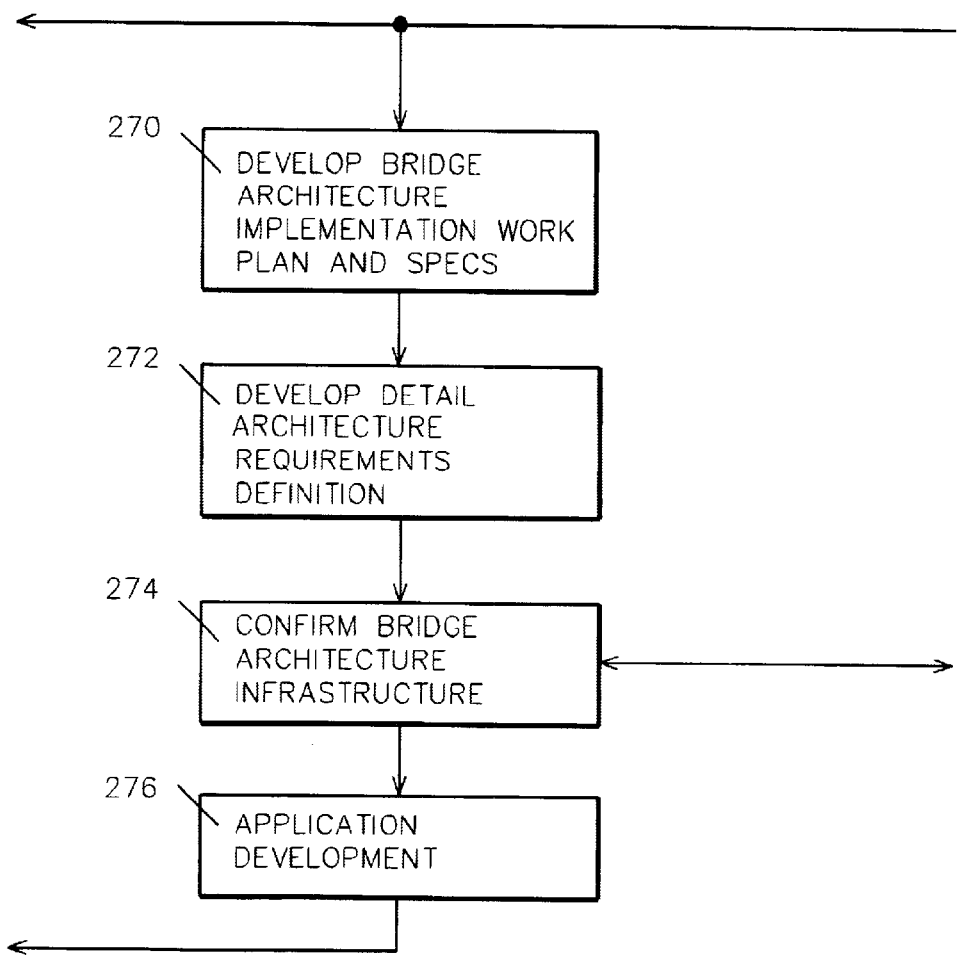
Figure 3H:
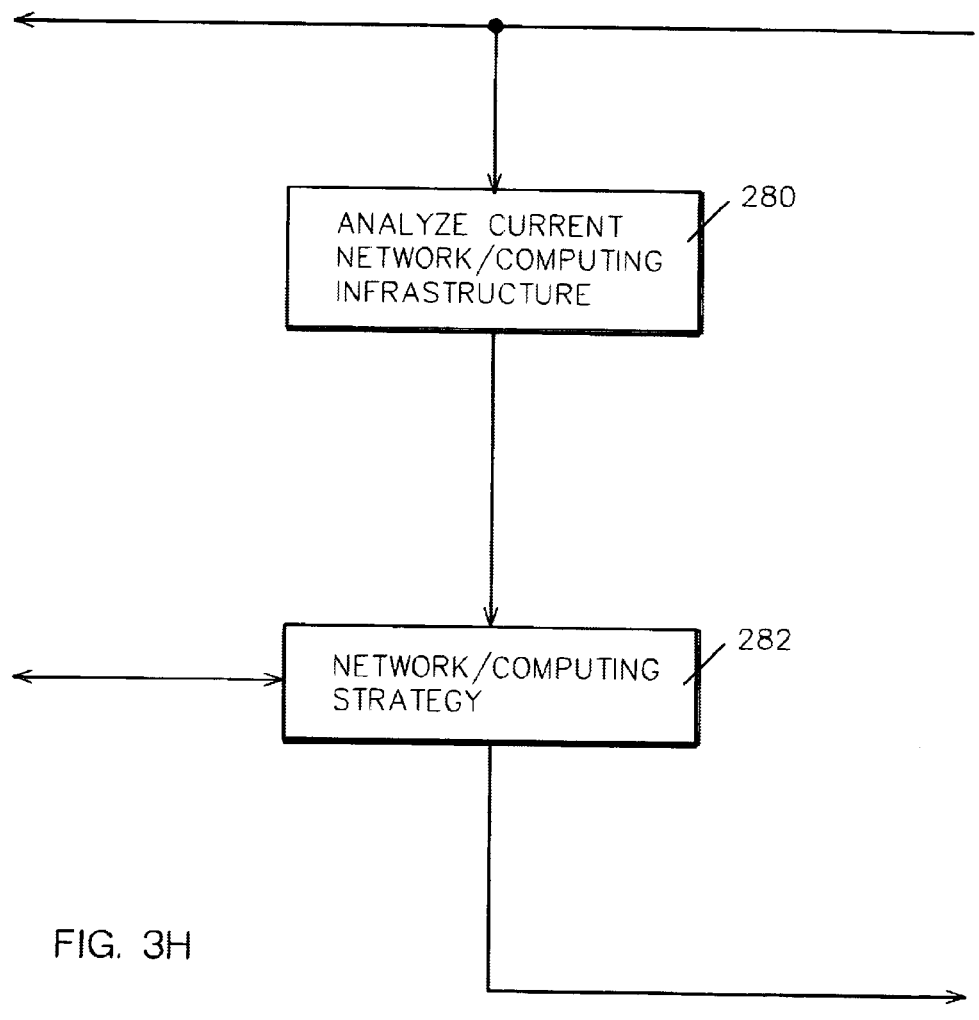
Figure 3J:
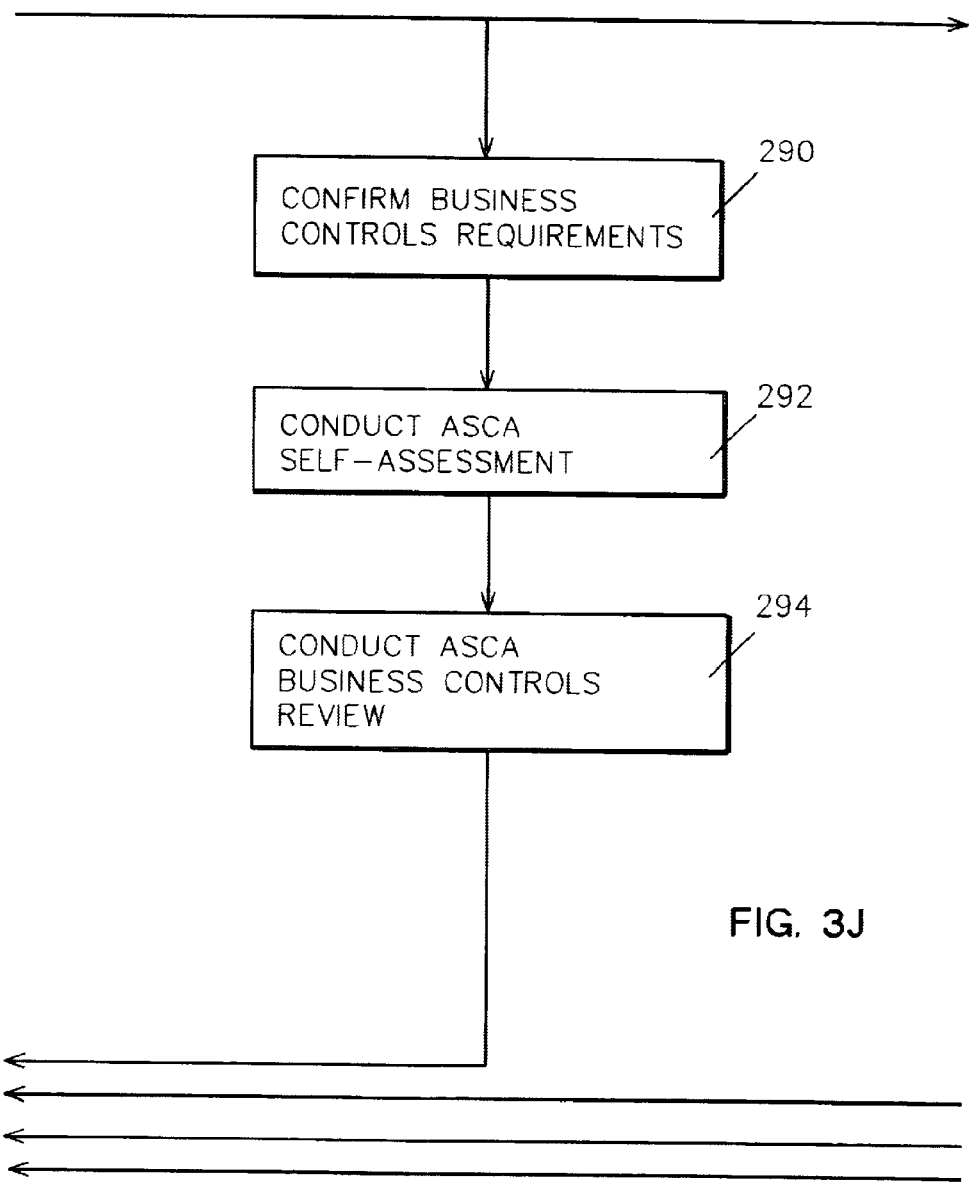
Figure 3K:
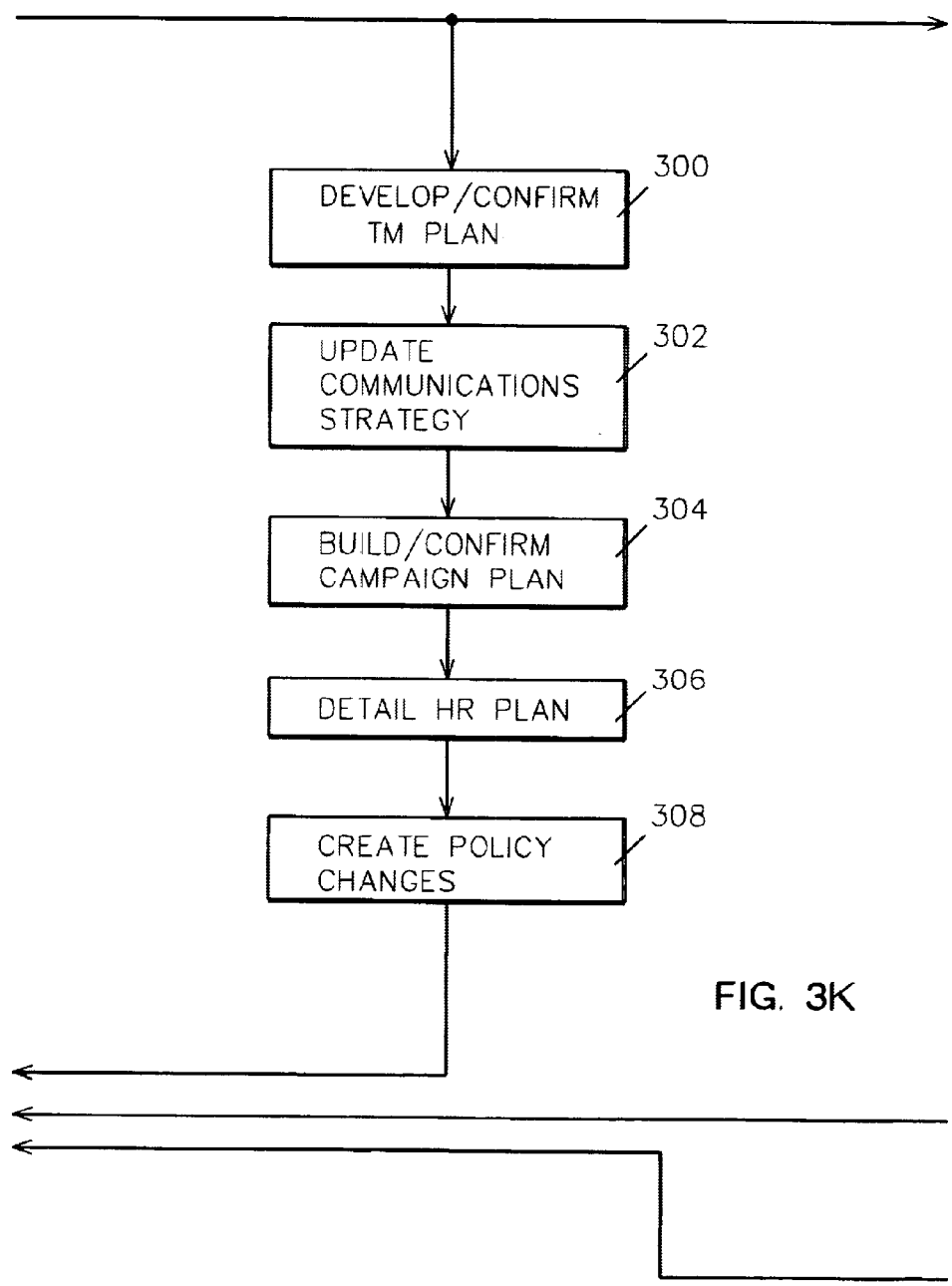
Figure 3L:
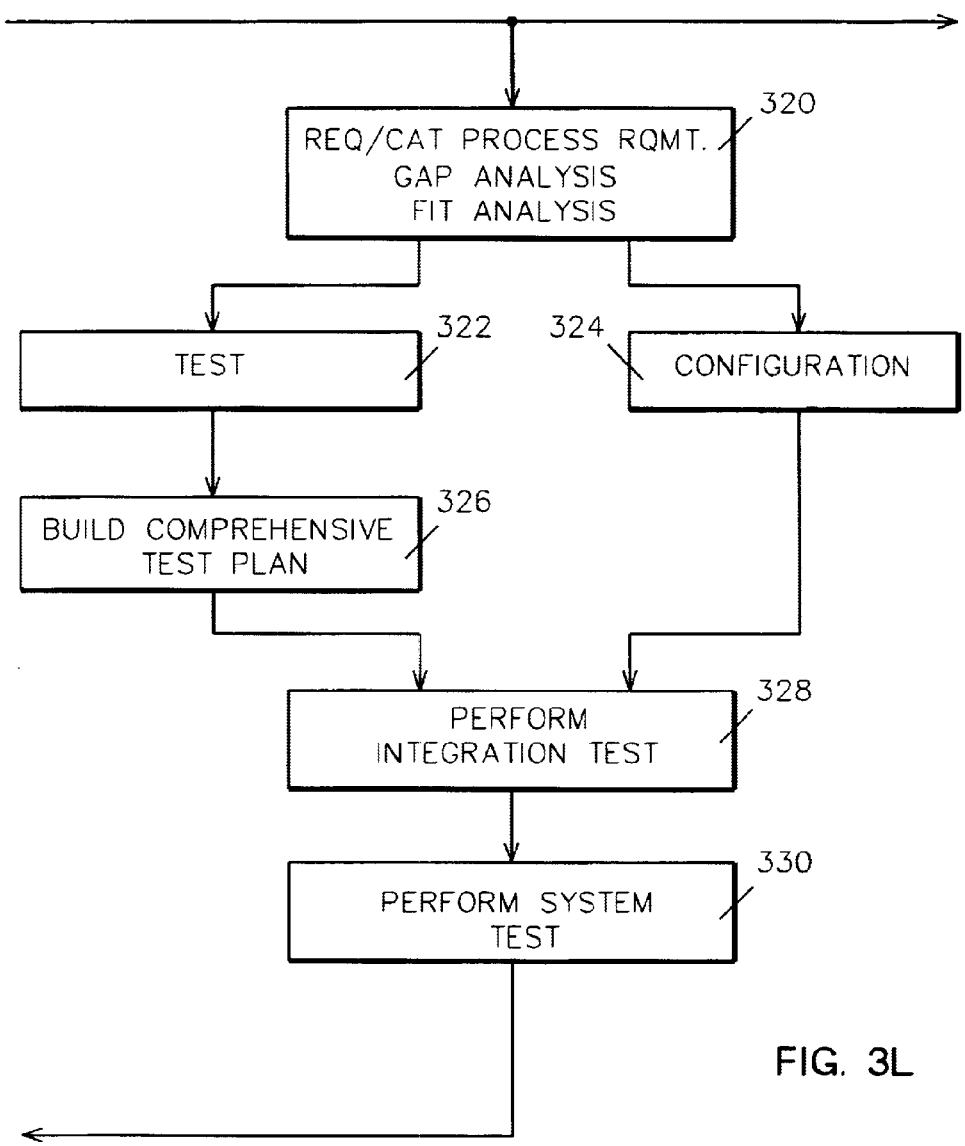
Figure 3M:
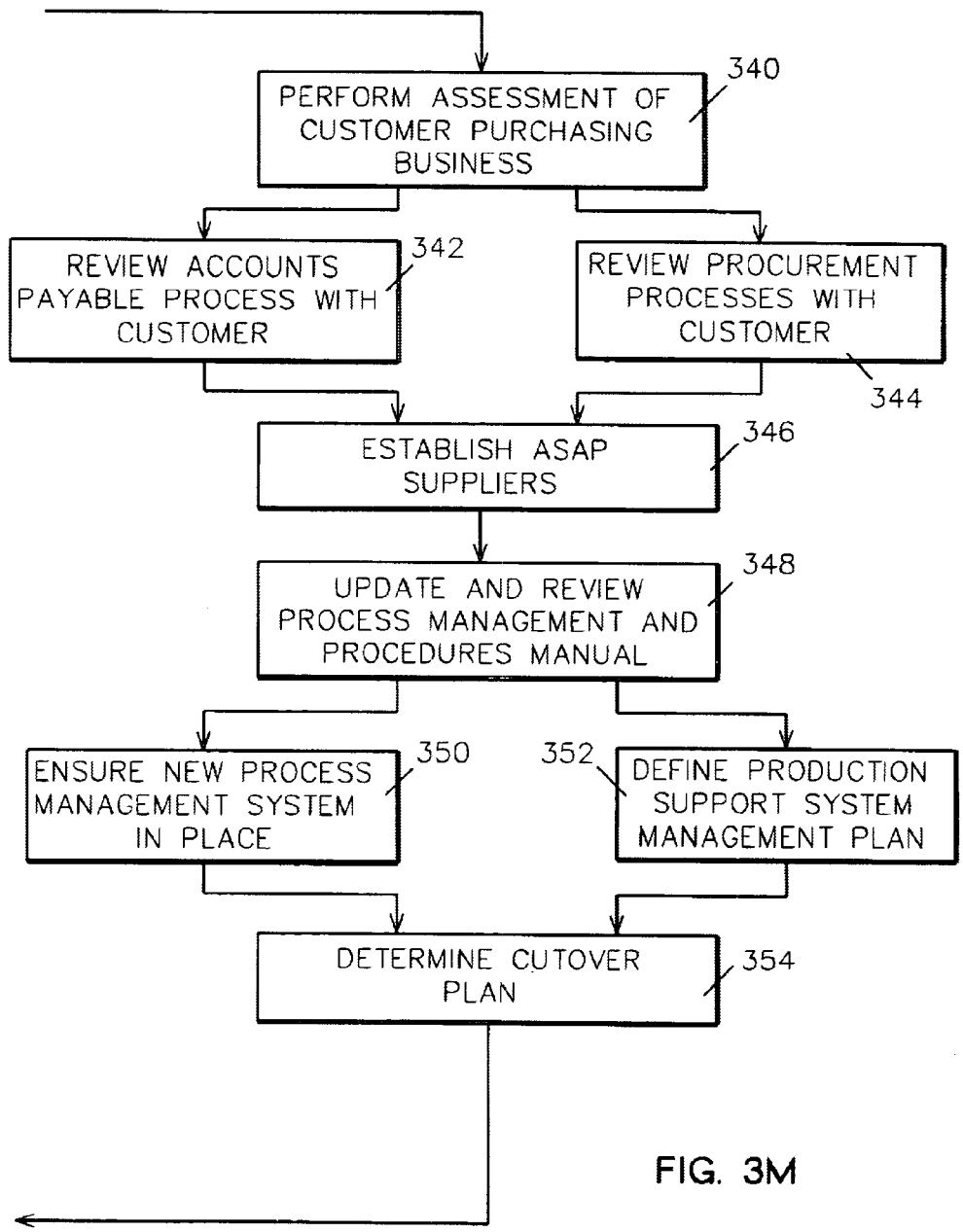

Referring to FIG. 3A, a series of steps illustrating an exemplary critical path through assessment stage 101 will be described. Qualify potential client step 170, which actually pertains to pre-sales stage 100, is based on use of the detail task template P711, selected portions of which are set forth in Table 5. In step 172, using detail task template PD11, a customer transition assessment is performed. In step 174, using detail task template P111, a customer business assessment is performed. In step 176, using detail task template P117, the workshop approach is formulated. In step 178, using summary task template P12, the recommended service offering is introduced to the customer. In step 180, using summary task template P91, project planning is initiated and the project manager assigned.

While these steps 170–180 represent a path through the assessment stage 101, other summary and detail tasks designated in Table 4 as pertaining to stage 101 are typically included in the initial set of templates for this customer, and are also used as they are determined to be applicable. Selected fields of the template P711 for stage 100 step 170 are represented in the detail task template of Table 5. Some field entries are dynamic and changeable during the course of assessment stage 101. The templates are also editable for a particular project, and do not necessarily continue during use to conform to the original format.

Referring to step 170, once a potential client is identified, this client must be qualified for an offering(s) before continuing further. Information is gathered from the client or other sources about the client to determine if they are generally a match for one of the offerings. Telephone conferences or meetings may be held to gather/confirm this information and to confirm that the potential client wishes to progress towards an engagement. In step 170, the marketing team accesses template P711 in the course of qualifying a prospective customer for the assessment stage. Template 170 provides, either directly or by way of links, other documents, instructions, flow charts, and checklists for guiding and documenting the work of the marketing team through the steps for doing so. Those steps are performed by multiple people within the team and are as follows:
1. Offering interest is communicated to BPM Opportunity Manager by Sales/Client.
2. Client information is gathered (from sources; client phone calls, etc.) by BPM Opportunity Manager.
   Marketing Materials—Offering Information
   Client Qualification Questions/Tool
   Pre Assessment Data Collection Pre Assessment Questions Pre Assessment Spend, Tax, and Budgets 3. Opportunity Manager completes initial qualification form.
4. Opportunity Manager forwards 'qualified' client interest to S&P Marketing Rep.
5. S&P Marketing Rep makes client contact to pursue assessment SOW, capture assessment scope details.
6. S&P Marketing Rep confirms client interest and forwards client assessment scope information to process, IT, and consulting reps.

The deliverables resulting from step 170 include the following:

Qualified client

Client background information

Marketing Materials—Offering Information

Client Qualification Questions/Tool

Pre Assessment Data Collection

Pre Assessment Questions

Pre Assessment Spend, Tax, and Budgets

Initial Qualification Form

Request for Assessment SOW (provides Assessment scope)

An attachment including either a blank template or an example from a previous offering is linked to template P711 for each of the above deliverables for use by members of the team executing this step 170.

TABLE 5

DETAIL TASK: QUALIFY POTENTIAL CLIENT

CREATION STATUS

| | |
|---|---|
| Category: | Project Management |
| Team: | Marketing |
| Offering type: | Req/Cat, SAP, Req/Cat&SAP |
| Stage: | O. Pre-Sales |
| Doc owned by: | J. M. |
| Doc created by: | J. M. |
| Dev status: | Edit 2 |

IMPORTANCE BUTTONS

| | |
|---|---|
| Education: | Yes |
| Certification: | Yes |
| Auditable: | Yes |
| Critical path: | Yes |

IMPLEMENTATION

| | |
|---|---|
| Task order: | 1 |
| % complete: | 80% |
| Executed by: | Enterprise |
| Performed by: | Marketer |
| Priority: | High |
| Work effort: | Days |
| Sequence: | |
| Support Resources: | Accounts Payable Analyst, Assessment Team, Customer, Procurement Analyst, Project Manager |

DETAIL TASK DETAILS

Prerequisites:

Client expresses interest in an offering; or an Enterprise client rep/exec indicates their client may have an interest. Request is routed to the Opportunity Manager for initial qualification.

Task steps:

1. Offering interest is communicated to BPM Opportunity Manager
2. BPM Opportunity Manager gathers additional client information (from sources; client phone calls, etc.) using
3. Opportunity Manager completes Initial Qualification Form.

TABLE 5-continued

DETAIL TASK: QUALIFY POTENTIAL CLIENT

4. If the opportunity is not qualified, transfer interest / client potential to alternate offering or respond to Enterprise Client rep that client doesn't suit any Enterprise offering.
5. Opportunity Manager forwards 'qualified' client interest to S&P Marketing Rep together with completed forms.
6. S&P Marketing Rep makes client contact to pursue Assessment SOW, capture Assessment scope details
7. S&P Marketing Rep confirms client interest and forwards client / Assessment scope information to Process, IT, and Consulting reps. At this time, the S&P Rep will request an Assessment SOW be built.

Methodology attachments:

Opportunity Management Process Flow -> 
Marketing Materials -- Offering Information -> 
Client Qualification Questions / Tool -> 
Pre Assessment Data Collection -> 
Pre Assessment Questions -> 
Pre Assessment Spend, Tax, and Budgets ->

Referring to step 172, a transition management team accesses template PD11 in the course of performing a customer transition assessment, the objective of which is to obtain understanding of the prospective client's business and HR operation and infrastructure. A transition management questionnaire is linked from template PD11 and is used to target specific areas to provide insights to the client's operation in the following key areas:

Business Organization/Structure

Business Processes

Measurements

Management Systems

HR Considerations.

Template PD11, a sample of which is provided in Table 6, provides, either directly or by way of links to other documents, instructions, flow charts, sample questionnaires, report models and checklists for guiding, coordinating and documenting the work of the transition management team through the steps for doing so.

TABLE 6

DETAIL TASK: DEVELOP INITIAL ASSESSMENT OF CLIENT

CREATION STATUS

| | |
|---|---|
| Category: | Transition Management |
| Team: | Transition Management |
| Offering type: | Req/Cat, SAP, Req/Cat&SAP |
| Stage: | 1. Engagement Assessment |
| Doc owned by: | C. L. |
| Doc created by: | O. F. |
| Dev status: | Approved |

IMPORTANCE BUTTONS

| | |
|---|---|
| Education: | Yes |
| Certification: | Yes |
| Auditable: | No |
| Critical path: | No |

IMPLEMENTATION

| | |
|---|---|
| Task order: | 1 |
| % complete: | 100% |
| Executed by: | Service Provider |
| Performed by: | Communications Manager |
| Support Resources | Customer, Project Manager |
| Priority: | High |
| Work effort: | Days |

TABLE 6-continued

DETAIL TASK: DEVELOP INITIAL ASSESSMENT OF CLIENT

DETAIL TASK DETAILS

Description:
Initial Assessment:

Within the Assessment stage, the prospective client will be asked to complete questionnaires from different disciplines These completed questionnaires will allow the Enterprise TC to obtain understanding of the prospective clients business and HR operation and infrastructure. The transition management questionnaire will target specific areas and is intended to provide insights to the clients operation in the following key areas:
Business organization / Structure
Business Processes
Measurements
Management Systems
HR Considerations
Note: Please see the recommended "Transition Management Questionnaire" included as an attachment.
Analysis:

Once the prospective client has completed the questionnaire, analysis activities must take place. It is imperative that the responsible team member participates in this activity to gain a better understanding of the complexity and customization required in the transition plans and programs as well as customizing the Transition Management presentation for the workshop.
Consideration must be given to each aspect of the workshop presentation. Adjustments should be made to the workshop presentation based on the prospective client's unique situation and will include:.
Human resources changes
Changes in roles and responsibilities
Organized Labor / Union activities
Organizational impacts
Suppiler relationships
Changes in individual roles and responsibilities
Management System / Measurement System Changes
The objective is to get an early identification of those key areas where change will take place and make sure they are recognized with an action plan through the strategy and transition management plan.
Prerequisites:

The prospect has been qualified by marketing and the decision is made to pursue this as an opportunity for EPS services offering.
Client Questionnaire (Transition Management)

During this period the client will be asked to participate and respond to questions from several disciplines From a transition management perspective, this same process will be used to gather initial information to help frame the first view of the client transition management needs. The questionnaire is intended to assist with the customization of the TM presentation at the client workshop. In addition it will help update the strategy for the client and frame the specific transition management plan for the client.
The process for managing the client questionnaire is as follows:
Contact the project manager or workshop coordinator to ensure the transition management questionnaire is included in any consolidated client questionnaire package that is being used.
If the assessment is being managed by the Enterprise Consulting Group (ICG), contact the engagement manager and ensure the transition management questionnaire is part of their engagement material. You should require that they have the document completed as part of their deliverables.
Work with the project manager or workshop coordinator to determine who in the client account is responsible for HR and ensure that person will respond to the questionnaire. The client HR person responsible for responding to the questionnaire will respond with the client view of changes that will impact the various populations affected by the implementation. This will primarily be process users, administration, direct management of the process at the client location. The HR representative from the client must be able to properly reflect the roles and responsibilities of the affected areas within the client as well as respond to questions relative to client culture, behavior, and management system.
Review the questionnaire to ensure all questions are applicable to this client. If any questions are not applicable, they may be deleted prior to deliver to the client.
Provide the questionnaire to the client and be prepared to respond to any inquiries for clarification. It should take only a few days for the client to complete this questionnaire and return to you. Set a target date of three working days for return of the questionnaire.
Analysis:

Receive the completed questionnaire from the client and review for omissions. It may be necessary to visit with the client to ensure understanding.
Document any unique circumstances that might be identified by the client. If there are activities within the client account that will make the transition more difficult, it should be noted here. These might be things like, recent plant / location closing, downsizing, layoffs, re-organizations, labor issues, recent job role changes, etc.
It will be useful to use the workshop presentation as a reference guide when analyzing the questions. Since the workshop presentation will be customized to reflect the client environment, it will serve as a checklist to ensure the analysis covers all affected areas. This will ensure all aspects of the client transition management issues are addressed and a plan in place to manage..
Deliverables:

Updated Workshop Presentation on Transition Management Methodology attachments:

Sample Initial Client Questionnaire ->
Sample Workshop Presentation ->
Step Checklist:

Use the following to track completion of each step:
Client Questionnaire (Performed by Comm. Mgr.)

| Step Status | Description |
|---|---|
| 1. | Contact the project manager or workshop coordinator to ensure the transition management questionnaire is included in any consolidated client questionnaire package that is being used. |
| 2. | If the assessment is being managed by the Enterprise Consulting Group (ICG), contact the engagement manager and ensure the transition management questionnaire is part of their engagement material. |
| 3. | Work with the project manager or workshop coordinator to determine who in the client account is responsible for HR and ensure that person will respond to the questionnaire. |
| 4. | Review the questionnaire to ensure all questions are applicable to this client. |
| 5. | Provide the questionnaire to the client and be prepared to respond to any inquiries for clarification. |

Analysis (by Communications Manager)

| | |
|---|---|
| 1. | Receive the completed questionnaire from the client and review for omissions |
| 2. | Document any unique circumstances that might be identified by the client. |

The Initial Client Questionnaire presents a spread sheet to be completed which asks for the following for each of several categories of expenditures: total spent, total spent via purchase order, total spent via blanket purchase order, total spent with core suppliers, total number of invoices, number of manual invoices, number of automated invoices (EDI), total number of suppliers, number of invoices paid via electronic funds transfer (EFT). The categories include marketing and advertising, information technology, third party maintenance, telecom equipment, facilities, human resources, business resources, with each of these including several more detailed line items.

Also, a link is provided to a human resources questionnaire to be completed. A sample questionnaire is set forth in Table 7.

TABLE 7

SAMPLE HUMAN RESOURCES QUESTIONNAIRE

Human Resources

The following questions should be answered and the results used to determine specific actions. These actions may include changes / actions for inclusion in the communications plan, the transition management plan or both.
The firm's human resources department must play a critical role in the development of this document and the actions that are developed as a result of this analysis. HR must be in agreement with any action taken.
Affected Individuals How many users (requesters / approved) will be affected by the implementation
Identify numbers affected by:
    Department
    Function
    Responsibility (requestor / approver)
Identify the key roles that will be affected by the implementation:
    By Department
    By Function
To what degree will the role change for those individuals affected by the implementation?
To what degree will the responsibilities change for those affected by the implementation?
    By Department
    By Function
    By Requestor
    By Approver
What jobs / tasks (if any) will be eliminated as a result of the implementation?
What has been the business response to job eliminations in the past?
What jobs / tasks (if any) will be added as a result of the implementation?
Organization
What changes in organization structure will occur due to the implementation?
    Illustrate a "before and after" picture.
    Provide details of all changes and include new roles / responsibilities.
What changes in reporting structure will occur due to the implementation?
    Illustrate a "before and after" picture.
    Provide details of all changes and include new roles / responsibilities.
Management Systems What changes will be implemented in the management system as a result of the implementation?
What changed in measurements will be implemented as a result of the implementation?
Labor structure Is there an active labor organization within the business?
If the answer to this is yes, the local management labor relations team must be involved in the development of the assessment. They should take the lead on any activity / changes that might affect their relationship with the labor union. As the representative of the firm, the management labor relations team will be addressing the following areas and are responsible to develop a plan to deal with any / all labor relations issues that might arise as a result of the implementation.
Are the workers affected by the above changed represented by a TABLE 7-continued

SAMPLE HUMAN RESOURCES QUESTIONNAIRE labor organization?
What is the schedule for contract negotiation?
What affect (if any) will the implementation have of current work rules?
What affect (if any) will the implementation have on roles / titles / responsibilities covered under the current collective bargaining agreement?
What actions are needed to manage any required changed in the current collective bargaining agreements?
Supplier Relationships How many suppliers will be affected by the implementation?
What changes will occur to the supplier base as a result of the implementations?
Identify those suppliers that will no longer be engaged after the implementation
Identify any contractual relationship with supplier that must be altered / severed.
Ensure the business legal department is engaged with any case of having to break a contract. The (the legal department) will manage any elements that might potentially be litigious.
Identify any changes in roles / responsibilities or suppliers as a result of the implementations
Is the relationship with the suppliers more on a personal basis rather than a business (arms length) basis?
How will be process change relative to the supplier / buyer interaction?
What buyers will be affected by the implementation and how will their roles / responsibilities differ from before the implementation?

In step 174, the assessment team accesses template P111 in the course of performing a customer business assessment, the objective of which is to assess the client's commodity profile, pricing and process flow and allow the service provider or Enterprise to determine the best course of action relative to the structure of the offering and better understand the client's buying profile and inputs and outputs. Template P111 provides, either directly or by way of links to other documents, instructions, flow charts, sample questionnaires, report models and checklists for guiding, coordinating and documenting the work of the assessment team through the steps for doing so. Table 8 illustrates selected fields from template P111 Perform Customer Business Assessment.

TABLE 8

DETAIL TASK: PERFORM CUSTOMER BUSINESS ASSESSMENT

CREATION STATUS

| | |
|---|---|
| Category: | Process |
| Team: | Assessment |
| Offering type: | Req/Cat Implementation Only, e-Req/Cat Implementation Only, SAP Implementation Only, Req/Cat&SAP Implementation, Assessments |
| Stage: | 1. Engagement Assessment |

IMPORTANCE BUTTONS

| | |
|---|---|
| Education: | Yes |
| Certification: | Yes |
| Auditable: | Yes |

IMPLEMENTATION

| | |
|---|---|
| Executed by: | Service Provider |
| Performed by: | Assessment Team |
| Support Resources: | Accounts Payable Analyst, Customer, Network Specialist, Marketer, Procurement Analyst, Project Manager |

TABLE 8-continued

DETAIL TASK: PERFORM CUSTOMER BUSINESS ASSESSMENT

DETAIL TASK DETAILS

Description:

This set of steps will assist with analysis and assessment of the clients commodity profile, pricing and process flow. It will also allow the service provider / Enterprise to determine the best course of action relative to the structure of the offering and better understand the client's buying profile and inputs and outputs.
This set of activities results in gathering client information, analyzing the data and documenting recommendations to improve the client's sourcing & procurement business practices. An additional deliverable is input to development of a proposal to provide this client with S&P BPM outsourcing
In one alternative for performing the assessment, the prospective client will be asked to complete questionnaires from different disciplines. These completed questionnaires will allow the Enterprise TC (Assessment Team) to obtain understanding of the prospective client's business, operations and infrastructure.
The objective is to get an early identification of those key areas where change will take place and make sure they are recognized as a gap - either to current client practice or to the standard offering.

Prerequisites:

The prospect has been qualified by marketing and the decision is made to pursue this as an opportunity for EPS services offering. Acceptance by client of Assessment Sow (optional, not fee-based if answering an RFP)

Task steps:

Conduct a non-production buy analysis
Purchase order file data collection (corporate sources)
AP file data collection
Validation of findings
If the process or IT personnel are not directly supporting (not on the assessment team): Participate in weekly teleconference with assessment team to determine the path the engagement is heading and provide guidance and respond to questions from the assessment team
Conduct Site Visits as required to gain first hand knowledge and assist with analysis
interviews
process review
data collection
Contract /Service Review - detailed data collection specific to contract composition/standards, process to establish and current 'special/extended' agreements with supplier
Perform a strategic commodity assessment on the specified subset of commodities (from the SOW scope)
Review universal market basket
Review inputs, outputs and process flow to determine applicability of replacing paper invoices with images
Review and perform operational / cost analysis
sourcing and procurement process review - includes Obtain client team roles / responsibility matrix for understanding and analysis of how the client uses their resources for procurement and look for opportunities to improve efficiency at the client location.
AP process review-
procurement cost data collection - budget & full-time Equivalents (FTEs)
AP cost data collection - budget & full-time Equivalents (FTEs) ensure cost data includes IT support, software licenses, hardware, storage cost etc
validation of findings
Analyze completed questionnaires < if the send questionnaire; receive client provided data alternative is used. this is an alternate method to working hand-in-hand with a client core team to compile information in the same areas. the questionnaires here would be the general set of questions -->
profile2.doc/profile2.lwp and busass.123>
Document any unique circumstances that might be identified by the client. If there are activities within the client account that will make the transition more difficult, it should be noted

TABLE 8-continued

DETAIL TASK: PERFORM CUSTOMER BUSINESS ASSESSMENT here.
System Application Support - Obtain support information - resources, annual expense (in-house, subcontracted, outsourced). Where possible, gather the following information for elements of I/T that will affect Req / Cat , SAP or Image. These should be reported separately for easier use by specific teams.
Enterprise Architecture
Vendor master base
Network infrastructure
Current desktop footprint standard(s)
Human Resources Application
Ledger Application
Accounting Application
Information Warehouse or operational data repository
Approval mechanisms for Requisitions and POs
Account to commodity relationships
Source of info for tax rates
EDI Deliverables:

Current Process Model
A hierarchical representation of the existing activities of the enterprise, or a portion of it, showing the interactions among those activities, including the movement of data between them. The model is both a textual and graphical representation of those functions and processes within the boundary of the project. The textual portion consists of the process names and descriptions, descriptions of the activities that make up each process, and any related comments. The textual portion also describes the information and physical things flowing in and out of each process. The graphical representation consists of diagrams ot the flows entering and leaving each process.
Current Information Technology Architecture
A graphical representation of the existing applications/datastores and platforms that support the enterprise, or a portion of it, showing the interactions among those applications, including the movement of data between them.
Recommended improvement actions Methodology attachments:

Sample Initial Client Questionaire ->
Profile2 (for details to answer question 9)->
Sample Workshop Presentations->

In step 176, the assessment team and project manager access template P117 in the course of formulating a workshop approach, the objective of which is to provide guidance in developing the business case associated with this engagement and assist with the preparation of different business options based on the results of the assessment. Template P117 provides, either directly or by way of links to other documents, instructions, flow charts, sample questionnaires, report models and checklists for guiding, coordinating and documenting the work of the assessment team through the steps for doing so. These steps include (1) assembling a Customer Business Assessment Information and review, (2) determining the most appropriate offering to be developed for the client, (3) confirming business processes high level fit to recommended offering, (4) validating and documenting business reasons for investing in workshop, (5) reviewing with project management for critique and approval to proceed, and (6) validating Recommended Service Offering during workshop. The deliverable is a business CAS standard documentation template.

In step 178, the assessment team, accesses summary template P12 in the course of introducing a recommended service offering to the customer. The tasks described in this segment guide the service provider to present the final offering to the prospective client and guide the development of the business case for the project office and team. Template 178 and its subsidiary detailed templates provide, either directly or by way of links to other documents, instructions, flow charts, sample questionnaires, report models and checklists for guiding, coordinating and documenting the work of the assessment team through the steps for briefing the customer on the suggested offering, identifying and confirming client gaps to the standard offering, providing a high level customer scope document, completing the business case document, and drafting a document of understanding (DOU). Guidelines for the approver of this step, as for others, include the following: (1) Is the process documented as it is currently being performed? (2) Are the SAP actions and steps documented correctly? (3) Is the document complete? (4) Has the standard process been communicated or is there a plan to communicate it? (5) Are the metrics identified from the customer's point of view? (6) Are users trained or is there a plan to train them?

In step 180, which may positioned as a final step in the assessment stage or as an initial step in the project preparation stage, the project office accesses template P91 and its subsidiary detailed templates in the course of initiating project planning, including assigning a project manager. After the Engagement Assessment stage has been concluded, actual detailed planning for the realization of the project can be initiated. Based on the findings in the Assessment, the scope and general size and effort required for implementing the EPS offering for the customer is known, and can be broken down into a manageable project and resource plan including budgets. Once the plan has been developed and the resource requirements are known, the project team member qualifications can be determined both from the Customer and the service provider organizations. Once the team members have been identified and the project plan mapped out in detail and the project infrastructure has been validated, the project is introduced to the assembled project team prior to conducting the official kick-off meeting for the project. Summary task template P91 and its subsidiary detailed task templates provide, either directly or by way of links to other documents, instructions, flow charts, sample questionnaires, report models and checklists for guiding, coordinating and documenting the work of the project manager and assessment team through the steps for doing so, including (1) confirming the project scope and implementation strategy, (2) confirming project organization and assigning resources to roles, (3) preparing and validating project plan and procedures, (4) establishing project team working environment, and (5) orienting the project team. A check list is provided listing the deliverables and their status for tracking of these steps, including a realistic project plan and budget is signed off by the customer based on the assessment, the project team members are identified and committed based on requirements for qualifications, the project infrastructure, all inclusive, is agreed upon and established, and the project is communicated and bought into by project team members from both the service provider and the customer.

Advantages over the Prior Art

It is an advantage of the invention that there is provided a system and method for evaluating a client's general procurement and accounts payable (GP/AP) system.

It is an advantage of the invention that there is provided an optimized solution for out-sourcing procurement of goods and services.

It is an advantage of the invention that there is provided a system and method for training service providers.

It is an advantage of the invention that there is provided a system and method for managing service providers to assure quality of service.

It is an advantage of the invention that there is provided a system and method for managing a project.

It is an advantage of the invention that there is provided an optimized general procurement and accounts payable system characterized by lower costs, a paperless process, and more comprehensive service with a shorter cycle time.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing'signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. In a system for effecting through presales, assessment, preparation, development, deployment and support stages a transition from a legacy process to an integrated, cross-functional general procurement and accounts payable application of a customer of an enterprise, an assessment system comprising:

a server;

a storage device connected to said server;

a plurality of team terminals;

a communication link interconnecting said server and said terminals; and said server maintaining a database of templates including data fields and describing procedures for assessing said application on said storage device;

displaying to members of said teams in a playbook summary view a create a summary task selection button, a create a detailed task button, a folders and views section, a task title display and selection area;

responsive to member selection of a tasks selection button presenting in said selection area a listing of assessment stage tasks organized by categories, said categories including assessment tasks for performing customer service offering assessment, introducing recommend service offering to customer, and creating a proposal and contract for an integrated, cross-functional general procurement and accounts payable application;

accumulating into said data fields a description of said customer's processes, tools, and organizational structures;

serving said templates to members of cross function customer and enterprise teams operating said terminals;

responsive to input to said data fields at said terminals by said customer and enterprise teams, updating said database of templates to describe said legacy process and an integrated customer solution; and responsive to customer and enterprise teams updating said database of templates and transitioning said general procurement and accounts savable application from said assessment stage to said preparation, development, deployment and support stages.

2. The system of claim 1, said templates describing procedures and storing data entered to said templates by said customer and enterprise team for assessing said legacy process and describing said integrated customer solution through a plurality of tasks selectively including assessing an existing customer application, introducing a recommended service offering to said customer, creating a service offering proposal and contract, conducting a lost bid analysis, conducting a won bid analysis, conducting a transition to an implementation team, and conducting a transition management workshop; said system further:

displaying at a said terminal in a playbook summary view a create a summary task selection button, a create a detailed task button, a folders and views section, a task title display and a selection area;

responsive to member selection of said summary tasks selection button presenting in said selection area a listing of assessment stare tasks organized by categories, said categories including customer service offering assessment, recommended service offering customer presentation, Proposal and contract creation, transition management introduction;

responsive to user selection of said customer service offering assessment category, presenting in said selection area a first listing of assessment stage tasks and responsive to user selection of an assessment stage task from said first listing presenting to said user a first task template; said user, responsive to said first task template, selectively executing assessment tasks to perform customer business assessment, perform customer electronic requisition and catalog service business assessment, develop workshop management plan, develop workshop electronic requisition and catalog service management plan, review findings from marketing procurement consulting engagement, review findings from marketing procurement consulting engagement for electronic requisition and catalog service, formulate workshop approach, formulate electronic requisition and catalog service workshop approach, prepare for workshop, and prepare for electronic requisition and catalog service workshop;

responsive to user selection of said recommended service offering customer presentation category, presenting in said selection area a second listing of assessment stage tasks and responsive to user selection of an assessment stage task from said second listing presenting to said user a first task template; said user, responsive to said first task template, selectively executing assessment tasks to present service offering workshop to customer, present electronic requisition and catalog service offering workshop to customer (perform workshop), formulate proposal approach, and formulate proposal approach for electronic requisition and catalog service;

responsive to user selection of said proposal and contract creation category, presenting in said selection area a third listing of assessment stage tasks and responsive to user selection of an assessment stare task from said third listing presenting to said user a first task template; said user, responsive to said first task template, selectively executing assessment tasks to develop and cost proposal, and draft and price customer contracts; and responsive to user selection of said transition management introduction category, presenting in said selection area a fourth listing of assessment stage tasks and responsive to user selection of an assessment stage task from said fourth listing presenting to said user a first task template; said user, responsive to said first task template, selectively executing assessment tasks to develop initial assessment of client, and provide transition management workshop presentation.

3. The system of claim 2, each said template storing, either directly or by way of links to other documents, one or more instructions, flow charts, sample questionnaires, report models and checklists for guiding, coordinating and documenting the work of said customer and enterprise teams.

4. A method effecting through presales, assessment, preparation, development, deployment and support stages a transition from a legacy process to an integrated, cross-functional general procurement and accounts payable application, said assessment stage for providing an integrated, cross-functional customer solution to a client and comprising the steps of:

maintaining a database of templates including data fields and describing procedures for assessing said legacy process and said general procurement and accounts payable application;

operating a plurality of web-enabled user terminals to access via a server said database for coordinating tasks by a plurality of customer and enterprise teams implementing said procedures and entering data to said data fields describing said process and said application;

displaying to members of said teams in a playbook summary view a create a summary task selection button, a create a detailed task button, a folders and views section, a task title display and selection area;

responsive to member selection of a tasks selection button presenting in said selection area a listing of assessment stage tasks organized by categories, said categories including assessment tasks for performing customer service offering assessment, introducing recommend service offering to customer, and creating a proposal and contract for an integrated, cross-functional general procurement and accounts payable application; accumulating into said data fields a description of said customer's processes, tools, and organizational structures;

with reference to said description, said members defining in said database technical, educational, and human resource aspects of said integrated, cross-functional general procurement and accounts payable application for said customer; and delivering to said customer a workshop presenting an overview of said customer solution, initiating process analysis and strategic implementation, and confirming whether said customer solution satisfies customer needs;

thereby coordinating, recording and tracking customer and enterprise teams activities with respect to said assessment stage to provide a transition from said assessment stage to said preparation, development, deployment and support stages of said general procurement and accounts payable application.

5. The method of claim 4, each said template storing, either directly or by way of links to other documents, one or more instructions, flow charts, sample questionnaires, report models and checklists for guiding, coordinating and documenting the work of said customer and enterprise teams, said method further comprising:

displaying at a said terminal in a playbook summary view a create a summary task selection button, a create a detailed task button, a folders and views section, a task title display and a selection area;

responsive to member selection of said summary tasks selection button presenting in said selection area a listing of assessment stare tasks organized by categories, said categories including customer service offering assessment, recommended service offering customer presentation, proposal and contract creation transition management introduction;

responsive to user selection of said customer service offering assessment category, presenting in said selection area a first listing of assessment stage tasks and responsive to user selection of an assessment stage task from said first listing presenting to said user a first task template; said user responsive to said first task template, selectively executing assessment tasks to perform customer business assessment, perform customer electronic requisition and catalog service business assessment, develop workshop management plan, develop workshop electronic requisition and catalog service management plan, review findings from marketing procurement consulting engagement, review findings from marketing procurement consulting engagement for electronic requisition and catalog service, formulate workshop approach formulate electronic requisition and catalog service workshop approach, prepare for workshop, and prepare for electronic requisition and catalog service workshop;

responsive to user selection of said recommended service offering customer presentation category, presenting in said selection area a second listing of assessment stage tasks and responsive to user selection of an assessment stage task from said second listing presenting to said user a first task template; said user, responsive to said first task template, selectively executing assessment tasks to present service offering workshop to customer, present electronic requisition and catalog service offering workshop to customer (perform workshop) formulate proposal approach, and formulate proposal approach for electronic requisition and catalog service;

responsive to user selection of said proposal and contract creation category, presenting in said selection area a third listing of assessment stage tasks and responsive to user selection of an assessment stage task from said third listing presenting to said user a first task template, said user, responsive to said first task template, selectively executing assessment tasks to develop and cost proposal, and draft and price customer contracts; and responsive to user selection of said transition management introduction category, presenting in said selection area a fourth listing of assessment stage tasks and responsive to user selection of an assessment stage task from said fourth listing presenting to said user a first task template; said user, responsive to said first task template, selectively executing assessment tasks to develop initial assessment of client, and provide transition management workshop presentation.

6. The method of claim 4, further comprising:

receiving from said terminal data for entry to said database assessing an existing customer application, responsive to data entered to said database, introducing a recommended service offering to said customer, selectively responsive to said data entered to said database, creating a service offering proposal and contract, selectively responsive to data entered to said database and to said customer not accepting said contract, conducting a lost bid analysis, selectively responsive to data entered to said database and to said customer accepting said contract, conducting a won bid analysis, conducting a transition to an implementation team, and conducting a transition management workshop.

7. The method of claim 4, further, comprising the steps of:

gathering data describing requirements of said customer for procurement, and data describing currently used tools and processes for satisfying said requirements;

gathering data from said customer which describes a cost for future years of continuing with said currently used tools and processes;

entering said data to data fields of templates served to a user terminal for assessing a customer's legacy GP and AP system; and storing said templates for access by customer and enterprise teams in preparation, development, deployment and support stages of a new general procurement and accounts payable application.

8. A program storage device readable by a machine, tangibly embodying a program of instructions executable by a machine to perform method steps effecting through presales, assessment, preparation, development, deployment and support stages a transition from a legacy process to an integrated, cross-functional general procurement and accounts payable system for a client, said method steps comprising:

maintaining a database of templates including data fields and describing procedures for assessing said legacy process and said general procurement and accounts payable system;

operating a plurality of web-enabled user terminals to access via a server said database for coordinating tasks by a plurality of customer and enterprise teams implementing said procedures and entering data to said data fields describing said process and said general procurement and accounts payable system;

displaying to members of said teams in a playbook summary view a create a summary task selection button, a create a detailed task button, a folders and views section, a task title display and selection area;

responsive to member selection of a tasks selection button presenting in said selection area a listing of assessment stage tasks organized by categories, said categories including assessment tasks for performing customer service offering assessment, introducing recommend service offering to customer, and creating a proposal and contract for an integrated, cross-functional general procurement and accounts payable application;

accumulating into said data fields a description of said customer's processes, tools, and organizational structures;

with reference to said description, said members defining in said database technical, educational, and human resource aspects of said integrated, cross-functional general procurement and accounts payable application for said customer; and delivering to said customer a workshop presenting an overview of said customer solution, initiating process analysis and strategic implementation, and confirming whether said customer solution satisfies customer needs;

thereby coordinating, recording and tracking said customer and enterprise teams activities with respect to said assessment stage to provide a transition from said assessment stage to said preparation, development, deployment and support stages of said general procurement and accounts payable system.

9. The program storage device of claim 8, said method steps further comprising:

displaying at a said terminal in a playbook summary view a create a summary task selection button, a create a detailed task button, a folders and views section, a task title display and a selection area;

responsive to member selection of said summary tasks selection button presenting in said selection area a listing of assessment stage tasks organized by categories, said categories including customer service offering assessment, recommended service offering customer presentation, proposal and contract creation, transition management introduction;

responsive to user selection of said customer service offering assessment category, presenting in said selection area a first listing of assessment stage tasks and responsive to user selection of an assessment stage task from said first listing presenting to said user a first task template; said user, responsive to said first task template, selectively executing assessment tasks to perform customer business assessment, perform customer electronic requisition and catalog service business assessment, develop workshop management plan, develop workshop electronic requisition and catalog service management plan, review findings from marketing procurement consulting engagement, review findings from marketing procurement consulting engagement for electronic requisition and catalog service, formulate workshop approach, formulate electronic requisition and catalog service workshop approach, prepare for workshop, and prepare for electronic requisition and catalog service workshop;

responsive to user selection of said recommended service offering customer presentation category, presenting in said selection area a second listing of assessment stage tasks and responsive to user selection of an assessment stage task from said second listing presenting to said user a first task template; said user, responsive to said first task template, selectively executing assessment tasks to present service offering workshop to customer, present electronic requisition and catalog service offering workshop to customer (perform workshop), formulate proposal approach, and formulate proposal approach for electronic requisition and catalog service;

responsive to user selection of said proposal and contract creation category, presenting in said selection area a third listing of assessment stage tasks and responsive to user selection of an assessment stage task from said third listing presenting to said user a first task template; said user, responsive to said first task template, selectively executing assessment tasks to develop and cost proposal, and draft and price customer contracts; and responsive to user selection of said transition management introduction category, presenting in said selection area a fourth listing of assessment stage tasks and responsive to user selection of an assessment stage task from said fourth listing presenting to said user a first task template; said user, responsive to said first task template, selectively executing assessment tasks to develop initial assessment of client, and provide transition management workshop presentation.

10. An article of manufacture comprising:

a computer useable medium having computer readable program code means embodied therein for effecting through presales, assessment, preparation, development, deployment and support stages a transition from a legacy process to an integrated, cross-functional general procurement and accounts payable system for a client, the computer readable program means in said article of manufacture comprising:

computer readable program code means for causing a computer to effect maintaining a database of templates including data fields and describing procedures for assessing said legacy process and said general procurement and accounts payable system; and computer readable program code means for causing a computer to operate a plurality of web-enabled user terminals to access via a server said database for entering data to said data fields describing said legacy process and said general procurement and accounts payable system for said client and coordinating tasks by a plurality of customer and enterprise teams implementing said procedures;

computer readable program code means for causing a computer to effect displaying to members of said teams in a playbook summary view a create a summary task selection button, a create a detailed task button, a folders and views section, a task title display and selection area;

computer readable program code means for causing a computer to effect responsive to member selection of a tasks selection button presenting in said selection area a listing of assessment stage tasks organized by categories, said categories including assessment tasks for performing customer service offering assessment, introducing recommend service offering to customer, and creating a proposal and contract for an integrated, cross-functional general procurement and accounts payable application;

computer readable program code means for causing a computer to effect accumulating into said data fields a description of said customer's processes, tools, and organizational structures;

computer readable program code means for causing a computer to effect receiving from said members and storing to said database data defining technical, educational, and human resource aspects of said integrated, cross-functional general procurement and accounts payable application for said customer; and computer readable program code means for causing a computer to effect preparing a workshop presentation providing an overview of said customer solution, initiating process analysis and strategic implementation, and confirming whether said customer solution satisfies customer needs.

* * * * *